US010306753B1

(12) United States Patent
Fadden et al.

(10) Patent No.: US 10,306,753 B1
(45) Date of Patent: May 28, 2019

(54) ENCLOSURE-TO-BOARD INTERFACE WITH TAMPER-DETECT CIRCUIT(S)

(71) Applicant: INTERNATIONAL BUSINESS MACHINES CORPORATION, Armonk, NY (US)

(72) Inventors: Kathleen Ann Fadden, Poughkeepsie, NY (US); James A. Busby, New Paltz, NY (US); David C. Long, Wappingers Falls, NY (US); John R. Dangler, Rochester, MN (US); Alexandra Echegaray, Wappingers Falls, NY (US); Michael J. Fisher, Poughkeepsie, NY (US); William Santiago-Fernandez, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/901,985

(22) Filed: Feb. 22, 2018

(51) Int. Cl.
*H03K 5/00* (2006.01)
*H05K 1/02* (2006.01)
(Continued)

(52) U.S. Cl.
CPC ......... *H05K 1/0275* (2013.01); *H05K 1/115* (2013.01); *H05K 1/181* (2013.01); *H05K 3/00* (2013.01);
(Continued)

(58) Field of Classification Search
None
See application file for complete search history.

(56) References Cited

U.S. PATENT DOCUMENTS

| 3,165,569 A | 1/1965 | Bright et al. |
| 4,160,503 A | 7/1979 | Ohlbach |
| (Continued) | | |

FOREIGN PATENT DOCUMENTS

| CN | 2014-30639 Y | 3/2010 |
| CN | 10-4346587 A | 2/2015 |
| (Continued) | | |

OTHER PUBLICATIONS

Holm, Ragnar, "Electric Contacts: Theory and Application", Spinger-Verlag, New York, 4th Edition, 1981 (pp. 10-19).
(Continued)

*Primary Examiner* — Courtney L Smith
*Assistant Examiner* — Rashen E Morrison
(74) *Attorney, Agent, or Firm* — Tihon Poltavets, Esq.; Kevin P. Radigan, Esq.; Heslin Rothenber Farley & Mesiti P.C.

(57) ABSTRACT

Tamper-respondent assemblies and fabrication methods are provided which incorporate enclosure-to-circuit board protection. The tamper-respondent assemblies include a circuit board, and an enclosure mounted to the circuit board along an enclosure-to-board interface. The enclosure facilitates enclosing at least one electronic component coupled to the circuit board within a secure volume. A tamper-respondent electronic circuit structure facilitates defining the secure volume, and includes one or more tamper-detect circuits including at least one conductive trace disposed, at least in part, within the enclosure-to-board interface. The conductive trace(s) includes stress rise regions to facilitate tamper-detection at the enclosure-to-board interface. An adhesive is provided to secure the enclosure to the circuit board. The adhesive contacts, at least in part, the conductive trace(s) of the tamper-detect circuit(s) at the enclosure-to-board inter-
(Continued)

face, including at the stress rise regions of the conductive trace(s).

13 Claims, 18 Drawing Sheets

(51) Int. Cl.
*H05K 1/18* (2006.01)
*H05K 1/11* (2006.01)
*H05K 3/00* (2006.01)
*H05K 5/00* (2006.01)

(52) U.S. Cl.
CPC ..... *H05K 5/00* (2013.01); *H05K 2201/09263* (2013.01); *H05K 2201/10227* (2013.01)

(56) References Cited

U.S. PATENT DOCUMENTS

| | | | |
|---|---|---|---|
| 4,211,324 | A | 7/1980 | Ohlbach |
| 4,324,823 | A | 4/1982 | Ray, III |
| 4,496,900 | A | 1/1985 | Di Stefano et al. |
| 4,516,679 | A | 5/1985 | Simpson |
| 4,593,384 | A | 6/1986 | Kleinjne |
| 4,609,104 | A | 9/1986 | Kasper et al. |
| 4,653,252 | A | 3/1987 | Van de Haar et al. |
| 4,677,809 | A | 7/1987 | Long et al. |
| 4,691,350 | A | 9/1987 | Kleijne et al. |
| 4,807,284 | A | 2/1989 | Kleijne |
| 4,811,288 | A | 3/1989 | Kleijne et al. |
| 4,860,351 | A | 8/1989 | Weingart |
| 4,865,197 | A | 9/1989 | Craig |
| 5,009,311 | A | 4/1991 | Schenk |
| 5,027,397 | A | 6/1991 | Double et al. |
| 5,060,114 | A | 10/1991 | Feinberg et al. |
| 5,075,822 | A | 12/1991 | Baumler et al. |
| 5,117,457 | A | 5/1992 | Comerford et al. |
| 5,159,629 | A | 10/1992 | Double et al. |
| 5,185,717 | A | 2/1993 | Mori |
| 5,201,868 | A | 4/1993 | Johnson |
| 5,201,879 | A | 4/1993 | Steele et al. |
| 5,211,618 | A | 5/1993 | Stoltz |
| 5,239,664 | A | 8/1993 | Verrier et al. |
| 5,389,738 | A | 2/1995 | Piosenka et al. |
| 5,406,630 | A | 4/1995 | Piosenka et al. |
| 5,506,566 | A | 4/1996 | Oldfield et al. |
| 5,568,124 | A | 10/1996 | Joyce et al. |
| 5,594,439 | A | 1/1997 | Swanson |
| 5,675,319 | A | 10/1997 | Rivenberg et al. |
| 5,715,652 | A | 2/1998 | Stahlecker |
| 5,761,054 | A | 6/1998 | Kuhn |
| 5,813,113 | A | 9/1998 | Stewart et al. |
| 5,858,500 | A | 1/1999 | MacPherson |
| 5,880,523 | A | 3/1999 | Cadelore |
| 5,988,510 | A | 11/1999 | Tuttle et al. |
| 6,121,544 | A | 9/2000 | Petsinger |
| 6,195,267 | B1 | 2/2001 | MacDonald, Jr. et al. |
| 6,201,296 | B1 | 3/2001 | Fries et al. |
| 6,233,339 | B1 | 5/2001 | Kawano et al. |
| 6,259,363 | B1 | 7/2001 | Payne |
| 6,261,215 | B1 | 7/2001 | Imer |
| 6,301,096 | B1 | 10/2001 | Wozniczka |
| 6,384,397 | B1 | 5/2002 | Takiar et al. |
| 6,420,971 | B1 | 7/2002 | Leck et al. |
| 6,424,954 | B1 | 7/2002 | Leon |
| 6,438,825 | B1 | 8/2002 | Kuhm |
| 6,469,625 | B1 | 10/2002 | Tomooka |
| 6,473,995 | B2 | 11/2002 | Miyakawa et al. |
| 6,512,454 | B2 | 1/2003 | Miglioli et al. |
| 6,686,539 | B2 | 2/2004 | Farquhar et al. |
| 6,746,960 | B2 | 6/2004 | Goodman |
| 6,798,660 | B2 | 9/2004 | Moss et al. |
| 6,817,204 | B2 | 11/2004 | Bash et al. |
| 6,853,093 | B2 | 2/2005 | Cohen et al. |
| 6,879,032 | B2 | 4/2005 | Rosenau et al. |
| 6,929,900 | B2 | 8/2005 | Farquhar et al. |
| 6,946,960 | B2 | 9/2005 | Sisson et al. |
| 6,957,345 | B2 | 10/2005 | Cesana et al. |
| 6,970,360 | B2 | 11/2005 | Sinha |
| 6,985,362 | B2 | 1/2006 | Mori et al. |
| 6,991,961 | B2 | 1/2006 | Hubbard et al. |
| 6,996,953 | B2 | 2/2006 | Perreault et al. |
| 7,005,733 | B2 | 2/2006 | Kommerling et al. |
| 7,015,823 | B1 | 3/2006 | Gillen et al. |
| 7,054,162 | B2 | 5/2006 | Benson et al. |
| 7,057,896 | B2 | 6/2006 | Matsuo et al. |
| 7,094,143 | B2 | 8/2006 | Wolm et al. |
| 7,094,459 | B2 | 8/2006 | Takahashi |
| 7,095,615 | B2 | 8/2006 | Nichols |
| 7,156,233 | B2 | 1/2007 | Clark et al. |
| 7,180,008 | B2 | 2/2007 | Heitmann et al. |
| 7,189,360 | B1 | 3/2007 | Ho et al. |
| 7,214,874 | B2 | 5/2007 | Dangler et al. |
| 7,247,791 | B2 | 7/2007 | Kulpa |
| 7,304,373 | B2 | 12/2007 | Taggart et al. |
| 7,310,737 | B2 | 12/2007 | Patel et al. |
| 7,465,887 | B2 | 12/2008 | Suzuki et al. |
| 7,475,474 | B2 | 1/2009 | Heitmann et al. |
| 7,515,418 | B2 | 4/2009 | Straznicky et al. |
| 7,549,064 | B2 | 6/2009 | Elbert et al. |
| 7,640,658 | B1 | 1/2010 | Pham et al. |
| 7,643,290 | B1 | 1/2010 | Narasimhan et al. |
| 7,663,883 | B2 | 2/2010 | Shirakami et al. |
| 7,672,129 | B1 | 3/2010 | Ouyang et al. |
| 7,731,517 | B2 | 6/2010 | Lee et al. |
| 7,746,657 | B2 | 6/2010 | Oprea et al. |
| 7,760,086 | B2 | 7/2010 | Hunter et al. |
| 7,768,005 | B2 | 8/2010 | Condorelli et al. |
| 7,783,994 | B2 | 8/2010 | Ball et al. |
| 7,787,256 | B2 * | 8/2010 | Chan ........ G06F 21/87 174/250 |
| 7,868,411 | B2 | 1/2011 | Easton et al. |
| 7,898,413 | B2 | 3/2011 | Hsu et al. |
| 7,901,977 | B1 | 3/2011 | Angelopoulos et al. |
| 7,923,830 | B2 | 4/2011 | Pope et al. |
| 7,947,911 | B1 | 5/2011 | Pham et al. |
| 7,963,395 | B2 | 6/2011 | Sandberg |
| 7,978,070 | B2 | 7/2011 | Hunter |
| 8,006,101 | B2 | 8/2011 | Crawford |
| 8,084,855 | B2 | 12/2011 | Lower et al. |
| 8,094,450 | B2 | 1/2012 | Cole et al. |
| 8,133,621 | B2 | 3/2012 | Wormald et al. |
| 8,101,267 | B2 | 6/2012 | Moh et al. |
| 8,199,506 | B2 | 6/2012 | Janik et al. |
| 8,287,336 | B2 | 10/2012 | Dangler et al. |
| 8,325,486 | B2 | 12/2012 | Arshad et al. |
| 8,345,423 | B2 | 1/2013 | Campbell et al. |
| 8,455,990 | B2 | 6/2013 | Warren et al. |
| 8,516,269 | B1 | 8/2013 | Hamlet et al. |
| 8,589,703 | B2 | 11/2013 | Lee et al. |
| 8,646,108 | B2 | 2/2014 | Shiakallis et al. |
| 8,659,506 | B2 | 2/2014 | Nomizo |
| 8,659,908 | B2 | 2/2014 | Adams et al. |
| 8,664,047 | B2 | 3/2014 | Lower et al. |
| 8,716,606 | B2 | 5/2014 | Kelley et al. |
| 8,730,715 | B2 | 5/2014 | Katti et al. |
| 8,755,191 | B2 * | 6/2014 | Riebel ............ H05K 7/1488 361/679.38 |
| 8,797,059 | B2 | 8/2014 | Boday et al. |
| 8,836,509 | B2 | 9/2014 | Lowy |
| 8,853,839 | B2 | 10/2014 | Gao et al. |
| 8,879,266 | B2 | 11/2014 | Jarvis et al. |
| 8,890,298 | B2 | 11/2014 | Buer et al. |
| 8,934,244 | B2 * | 1/2015 | Shelnutt ......... H05K 7/20254 361/699 |
| 8,947,889 | B2 | 2/2015 | Kelley et al. |
| 8,961,280 | B2 | 2/2015 | Dangler et al. |
| 9,003,199 | B2 | 4/2015 | Dellmo et al. |
| 9,011,762 | B2 | 4/2015 | Seppa et al. |
| 9,052,070 | B2 | 6/2015 | Davis et al. |
| 9,166,586 | B2 | 10/2015 | Carapelli et al. |
| 9,298,956 | B2 | 3/2016 | Wade et al. |
| 9,436,293 | B2 | 9/2016 | Faoro |
| 9,554,477 | B1 | 1/2017 | Brodsky et al. |

(56) References Cited

U.S. PATENT DOCUMENTS

| | | |
|---|---|---|
| 9,555,606 B1 | 1/2017 | Fisher et al. |
| 9,560,737 B2 | 1/2017 | Isaacs et al. |
| 9,578,764 B1 | 2/2017 | Fisher et al. |
| 9,591,776 B1 | 3/2017 | Brodsky et al. |
| 9,661,747 B1 | 5/2017 | Brodsky et al. |
| 9,717,154 B2 | 7/2017 | Brodsky et al. |
| 9,730,315 B1 | 8/2017 | Razaghi |
| 9,858,776 B1 | 1/2018 | Busby et al. |
| 9,877,383 B2 | 1/2018 | Brodsky et al. |
| 2001/0050425 A1 | 12/2001 | Beroz et al. |
| 2001/0056542 A1 | 12/2001 | Cesana et al. |
| 2002/0002683 A1 | 1/2002 | Benson |
| 2002/0068384 A1 | 6/2002 | Beroz et al. |
| 2002/0084090 A1 | 7/2002 | Farquhar |
| 2003/0009684 A1 | 1/2003 | Schwenck et al. |
| 2004/0228634 A1* | 11/2004 | Fricker .............. G02B 6/4453 398/135 |
| 2005/0068735 A1 | 3/2005 | Fissore et al. |
| 2005/0111194 A1 | 5/2005 | Sohn et al. |
| 2005/0180104 A1 | 8/2005 | Olesen et al. |
| 2006/0034731 A1 | 2/2006 | Lewis et al. |
| 2006/0072288 A1 | 4/2006 | Stewart et al. |
| 2006/0196945 A1 | 9/2006 | Mendels |
| 2006/0218779 A1 | 10/2006 | Ooba et al. |
| 2007/0035933 A1* | 2/2007 | Chuang .............. H05K 7/1492 361/752 |
| 2007/0064396 A1 | 3/2007 | Oman et al. |
| 2007/0064399 A1 | 3/2007 | Mandel et al. |
| 2007/0091559 A1* | 4/2007 | Malone ................. G06F 1/187 361/679.32 |
| 2007/0108619 A1 | 5/2007 | Hsu |
| 2007/0140787 A1* | 6/2007 | Champion ............ G06F 1/183 403/321 |
| 2007/0201210 A1* | 8/2007 | Chow .............. H02K 7/20727 361/704 |
| 2007/0211436 A1 | 9/2007 | Robinson et al. |
| 2007/0223165 A1 | 9/2007 | Itri et al. |
| 2007/0230127 A1 | 10/2007 | Peugh et al. |
| 2007/0268671 A1 | 11/2007 | Brandenburg et al. |
| 2008/0050512 A1 | 2/2008 | Lower et al. |
| 2008/0106400 A1* | 5/2008 | Hunter .................. G06F 21/87 340/540 |
| 2008/0144290 A1 | 6/2008 | Brandt et al. |
| 2008/0159539 A1 | 7/2008 | Huang et al. |
| 2008/0160274 A1 | 7/2008 | Dang et al. |
| 2008/0191174 A1 | 8/2008 | Ehrensvard et al. |
| 2008/0251906 A1 | 10/2008 | Eaton et al. |
| 2009/0073659 A1 | 3/2009 | Peng et al. |
| 2009/0097200 A1* | 4/2009 | Sharma ..................... G06F 1/18 361/688 |
| 2009/0161312 A1* | 6/2009 | Spearing ............ H05K 7/20727 361/679.47 |
| 2009/0166065 A1 | 7/2009 | Clayton et al. |
| 2010/0088528 A1 | 4/2010 | Sion |
| 2010/0110647 A1 | 5/2010 | Hiew et al. |
| 2010/0134959 A1 | 6/2010 | Fife et al. |
| 2010/0177487 A1* | 7/2010 | Arshad .................. G06F 21/86 361/737 |
| 2010/0319986 A1 | 12/2010 | Bleau et al. |
| 2010/0321874 A1* | 12/2010 | Bhattacharyya ... H05K 7/20736 361/679.5 |
| 2011/0001237 A1 | 1/2011 | Brun et al. |
| 2011/0038123 A1 | 2/2011 | Janik et al. |
| 2011/0103027 A1 | 5/2011 | Aoki et al. |
| 2011/0241446 A1 | 10/2011 | Tucholski |
| 2011/0299244 A1 | 12/2011 | Dede et al. |
| 2012/0048685 A1* | 3/2012 | Chen ..................... B25J 9/106 198/750.1 |
| 2012/0050998 A1 | 3/2012 | Klum et al. |
| 2012/0113581 A1* | 5/2012 | Anguiano-Wehde ......... G06F 1/187 361/679.33 |
| 2012/0117666 A1 | 5/2012 | Oggioni et al. |
| 2012/0140421 A1 | 6/2012 | Kirstine et al. |
| 2012/0319986 A1 | 6/2012 | Toh et al. |
| 2012/0185636 A1 | 7/2012 | Leon et al. |
| 2012/0244742 A1 | 9/2012 | Wertz et al. |
| 2012/0256305 A1 | 10/2012 | Kaufmann et al. |
| 2012/0320529 A1 | 12/2012 | Loong et al. |
| 2013/0033818 A1 | 2/2013 | Hosoda et al. |
| 2013/0104252 A1 | 4/2013 | Yanamadala et al. |
| 2013/0141137 A1 | 6/2013 | Krutzik et al. |
| 2013/0158936 A1 | 6/2013 | Rich et al. |
| 2013/0170217 A1 | 7/2013 | Lee |
| 2013/0208422 A1 | 8/2013 | Hughes et al. |
| 2013/0235527 A1 | 9/2013 | Wagner et al. |
| 2013/0283386 A1 | 10/2013 | Lee |
| 2014/0022733 A1 | 1/2014 | Lim et al. |
| 2014/0160679 A1 | 6/2014 | Kelty et al. |
| 2014/0184263 A1 | 7/2014 | Ehrenpfordt et al. |
| 2014/0204533 A1 | 7/2014 | Abeysekera et al. |
| 2014/0321064 A1 | 10/2014 | Bose et al. |
| 2014/0325688 A1 | 10/2014 | Cashin et al. |
| 2015/0007427 A1 | 1/2015 | Dangler et al. |
| 2015/0163933 A1 | 6/2015 | Steiner |
| 2015/0195943 A1* | 7/2015 | Fricker .............. H05K 7/1409 361/679.58 |
| 2015/0235053 A1 | 8/2015 | Lee et al. |
| 2016/0005262 A1 | 1/2016 | Hirato et al. |
| 2016/0012693 A1 | 1/2016 | Sugar |
| 2016/0137548 A1 | 5/2016 | Cabral, Jr. et al. |
| 2016/0262253 A1 | 9/2016 | Isaacs et al. |
| 2016/0262270 A1 | 9/2016 | Isaacs et al. |
| 2017/0019987 A1 | 1/2017 | Dragone et al. |
| 2017/0089729 A1 | 3/2017 | Brodsky et al. |
| 2017/0089977 A1 | 3/2017 | Warnock et al. |
| 2017/0091491 A1 | 3/2017 | Dangler et al. |
| 2017/0091492 A1 | 3/2017 | Brodsky et al. |
| 2017/0094778 A1 | 3/2017 | Brodsky et al. |
| 2017/0094783 A1 | 3/2017 | Dangler et al. |
| 2017/0094784 A1 | 3/2017 | Brodsky et al. |
| 2017/0094803 A1 | 3/2017 | Dangler et al. |
| 2017/0094804 A1 | 3/2017 | Brodsky et al. |
| 2017/0094805 A1 | 3/2017 | Dangler et al. |
| 2017/0094806 A1 | 3/2017 | Brodsky et al. |
| 2017/0094808 A1 | 3/2017 | Brodsky et al. |
| 2017/0094820 A1 | 3/2017 | Brodsky et al. |
| 2017/0094847 A1 | 3/2017 | Fisher et al. |
| 2017/0108543 A1 | 4/2017 | Brodsky et al. |
| 2017/0111998 A1 | 4/2017 | Brodsky et al. |
| 2017/0116439 A1 | 4/2017 | Sarafianos et al. |
| 2017/0116830 A1 | 4/2017 | Isaacs et al. |
| 2017/0156223 A1 | 6/2017 | Fisher et al. |
| 2017/0171999 A1 | 6/2017 | Fisher et al. |
| 2017/0249813 A1 | 8/2017 | Busby et al. |
| 2017/0316228 A1 | 11/2017 | Campbell et al. |
| 2017/0330844 A1 | 11/2017 | Busby et al. |
| 2017/0332485 A1 | 11/2017 | Busby et al. |

FOREIGN PATENT DOCUMENTS

| | | |
|---|---|---|
| DE | 19816571 A1 | 10/1999 |
| DE | 19816572 A1 | 10/1999 |
| DE | 10-2012-203955 A1 | 9/2013 |
| EP | 0 056 360 A1 | 10/1993 |
| EP | 0 629 497 A2 | 12/1994 |
| EP | 1 184 773 A1 | 3/2002 |
| EP | 1 207 444 A2 | 5/2002 |
| EP | 1 734 578 A1 | 12/2006 |
| EP | 1 968 362 A2 | 9/2008 |
| EP | 2 104 407 A1 | 9/2009 |
| EP | 1 672 464 B1 | 4/2012 |
| EP | 2 560 467 A1 | 2/2013 |
| JP | 61-297035 A | 12/1986 |
| JP | 2000-238141 A | 9/2000 |
| JP | 2013-125807 A | 6/2013 |
| JP | 2013-140112 A | 7/2013 |
| WO | WO 1999/003675 A1 | 1/1999 |
| WO | WO 1999/021142 A1 | 4/1999 |
| WO | WO 2001/063994 A2 | 8/2001 |
| WO | WO 2013/012606 A2 | 5/2002 |
| WO | WO 2003/025080 A1 | 3/2003 |
| WO | WO 2004/040505 A1 | 5/2004 |

(56) References Cited

FOREIGN PATENT DOCUMENTS

| WO | WO 2009/042335 A1 | 4/2009 |
| WO | WO 2009/092472 A1 | 7/2009 |
| WO | WO 2010/128939 A1 | 11/2010 |
| WO | WO 2013/004292 A1 | 1/2013 |
| WO | WO 2013/0189483 A1 | 12/2013 |
| WO | WO 2014/086987 A2 | 6/2014 |
| WO | WO 2014/158159 A1 | 10/2014 |

OTHER PUBLICATIONS

Clark, Andrew J., "Physical Protection of Cryptographic Devices", Advanced in Cyprtology, Eurocrypt '87, Springer, Berlin Heidelberg (1987) (11 pages).

Halperin et al., "Latent Open Testing of Electronic Packaging", MCMC-194, IEEE (1994) (pp. 83-33).

Simek, Bob, "Tamper Restrictive Thermal Ventilation System for Enclosures Requiring Ventilation and Physical Security", IBM Publication No. IPCOM000008607D, Mar. 1, 1998 (2 pages).

Pamula et al., "Cooling of Integrated Circuits Using Droplet-Based Microfluidics", Association for Computing Machinery (ACM), GLSVLSI'03, Apr. 28-29, 2003 (pp. 84-87).

Saran et al., "Fabrication and Characterization of Thin Films of Single-Walled Carbon Nanotube Bundles on Flexible Plastic Substrates", Journal of the American Chemical Society, vol. 126, No. 14 (Mar. 23, 2004) (pp. 4462-4463).

Khanna P.K. et al., "Studies on Three-Dimensional Moulding, Bonding and Assembling of Low-Temperature-Cofired Ceramics MEMS and MST Applications." Materials Chemistry and Physics, vol. 89, No. 1 (2005) (pp. 72-79).

Drimer et al., "Thinking Inside the Box: System-Level Failures of Tamper Proofing", 2008 IEEE Symposium on Security and Privacy, (Feb. 2008) (pp. 281-295).

Loher et al., "Highly Integrated Flexible Electronic Circuits and Modules", 3rd International IEEE on Microsystems, Packaging, Assembly & Circuits Technology Conference (Oct. 22-24, 2008) (Abstract Only) (1 page).

Sample et al., "Design of an RFID-Based Battery-Free Programmable Sensing Platform", IEEE Transactions on Instrumentation and Measurement, vol. 57, No. 11, Nov. 2008 (pp. 2608-2615).

Jhang et al., "Nonlinear Ultrasonic Techniques for Non-Destructive Assessment of Micro Damage in Material: A Review", International Journal of Prec. Eng. & Manuf., vol. 10, No. 1, Jan. 2009 (pp. 123-135).

Anonymous, "Consolidated Non-Volatile Memory in a Chip Stack", IBM Technical Disclosure: IP.com No. IPCOM000185250, Jul. 16, 2009 (6 pages).

Isaacs et al., "Tamper Proof, Tamper Evident Encryption Technology", Pan Pacific Symposium SMTA Proceedings (2013) (9 pages).

Anonymous, "Selective Memory Encryption", IBM Technical Disclosure: IP.com IPCOM000244183, Nov. 20, 2015 (6 pages).

Zhou et al., "Nonlinear Analysis for Hardware Trojan Detection", ICSPCC2015, IEEE (2015) (4 pages).

Harting Mitronics, "Safety Caps for Payment Terminals". http://harting-mitronics.ch/fileadmin/hartingmitronics/case_studies/Safety_caps_for_payment_terminals.pdf, download Aug. 2016 (2 pages).

Gold Phoenix Printed Circuit Board, "Why multilayer pcb is used widely?", May 7, 2012, accessed online @ [http://www.goldphoenixpcb.com/html/Support_Resource/others/arc_110.html] on Feb. 15, 2017.

Dragone et al., "Tamper-Respondent Assembly with Sensor Connection Adapter", U.S. Appl. No. 15/268,959, filed Sep. 19, 2016 (45 pages).

Dragone et al., "Vented Tamper-Respondent Assemblies", U.S. Appl. No. 15/275,748, filed Sep. 26, 2016 (53 pages).

Dragone et al., "Tamper-Respondent Assemblies with In Situ Vent Structure(s)", U.S. Appl. No. 15/275,762, filed Sep. 26, 2016 (72 pages).

Buby et al., "Tamper-Respondent Assemblies with Trace Regions of Increased Susceptibility to Breaking", U.S. Appl. No. 15/341,108, filed Nov. 2, 2016 (56 pages).

Brodsky et al., "Tamper-Respondent Assembly with Flexible Tamper-Detect Sensor(s) Overlying In-Situ-Formed Tamper-Detect Sensor", U.S. Appl. No. 15/430,842, filed Feb. 13, 2017 (61 pages).

Busby et al., "Multi-Layer Stack with Embedded Tamper-Detect Protection", U.S. Appl. No. 15/791,642, filed Oct. 24, 2017 (67 pages).

Brodsky et al., "Tamper-Respondent Assemblies", U.S. Appl. No. 15/800,497, filed Nov. 1, 2017 (108 pages).

Brodsky et al., "Overlapping, Discrete Tamper-Respondent Sensors", U.S. Appl. No. 15/819,540, filed Nov. 21, 2017 (111 pages).

Busby et al., "Tamper-Respondent Assembly with Nonlinearity Monitoring", U.S. Appl. No. 15/820,620, filed Nov. 22, 2017 (49 pages).

Brodsky et al., "Tamper-Respondent Assemblies with Enclosure-to-Board Protection", U.S. Appl. No. 15/827,275, filed Nov. 30, 2017 (54 pages).

Busby et al., "Tamper-Proof Electronic Packages Formed with Stressed Glass", U.S. Appl. No. 15/831,534, filed Dec. 5, 2017 (45 pages).

Busby et al, "Tamper-Proof Electronic Packages with Stressed Glass Component Substrate(s)", U.S. Appl. No. 15/831,554, filed Dec. 5, 2017 (56 pages).

Brodsky et al., "Tamper-Respondent Assemblies with Bond Protection", U.S. Appl. No. 15/835,557, filed Dec. 8, 2017 (111 pages).

Brodsky et al., "Tamper-Respondent Assemblies with Bond Protection", U.S. Appl. No. 15/835,569, filed Dec. 8, 2017 (108 pages).

Fisher et al., "Enclosure with Inner Tamper-Respondent Sensor(s) and Physical Security Element(s)", U.S. Appl. No. 15/835,585, filed Dec. 8, 2017 (113 pages).

Cambpell et al., "Tamper-Proof Electronic Packages with Two-Phase Dielectric Fluid", U.S. Appl. No. 15/836,958, filed Dec. 11, 2017 (60 pages).

Fisher et al., "Tamper-Respondent Assembly with Vent Structure", U.S. Appl. No. 15/836,966, filed Dec. 11, 2017 (61 pages).

* cited by examiner

ENCLOSURE-TO-BOARD INTERFACE WITH TAMPER-DETECT CIRCUIT(S)

BACKGROUND

Many activities require secure electronic communications. To facilitate secure electronic communications, an encryption/decryption system may be implemented on an electronic assembly or printed circuit board assembly that is included in equipment connected to a communications network. Such an electronic assembly is an enticing target for malefactors since it may contain codes or keys to decrypt intercepted messages, or to encode fraudulent messages. To prevent this, an electronic assembly may be mounted in an enclosure, which is then wrapped in a security sensor and encapsulated with polyurethane resin. A security sensor may be, in one or more embodiments, a web or sheet of insulating material with circuit elements, such as closely-spaced, conductive lines fabricated on it. The circuit elements are disrupted if the sensor is torn, and the tear can be sensed in order to generate an alarm signal. The alarm signal may be conveyed to a monitor circuit in order to reveal an attack on the integrity of the assembly. The alarm signal may also trigger an erasure of encryption/decryption keys stored within the electronic assembly.

SUMMARY

Provided herein, in one or more aspects, is a tamper-respondent assembly which includes a circuit board and an enclosure mounted to the circuit board along an enclosure-to-board interface. The enclosure, along with a tamper-respondent electronic circuit structure, facilitates enclosing at least one electronic component coupled to the circuit board within a secure volume. The tamper-respondent electronic circuit structure includes one or more tamper-detect circuits, including at least one conductive trace disposed, at least in part, within the enclosure-to-board interface. The at least one conductive trace includes stress rise regions to facilitate detecting a tamper event at the enclosure-to-board interface. An adhesive facilitates securing the enclosure to the circuit board. The adhesive contacts, at least in part, the at least one conductive trace of the one or more tamper-detect circuits within the enclosure-to-board interface, including at the stress rise regions of the at least one conductive trace.

In another aspect, a tamper-respondent assembly is provided which includes: a circuit board; at least one electronic component to be protected; an enclosure mounted to the circuit board along an enclosure-to-board interface; a tamper-respondent electronic circuit structure; and an adhesive. The at least one electronic component is associated with the circuit board, and the enclosure facilitates enclosing the at least one electronic component within a secure volume. The tamper-respondent electronic circuit structure assists in defining the secure volume, and includes one or more tamper-detect circuits, including at least one conductive trace disposed, at least in part, within the enclosure-to-board interface. The at least one conductive trace includes stress rise regions to facilitate detecting a tamper event at the enclosure-to-board interface. The adhesive secures the enclosure to the circuit board, and contacts, at least in part, the at least one conductive trace of the one or more tamper-detect circuits within the enclosure-to-board interface, including at the stress rise regions of the at least one conductive trace.

In a further aspect, a fabrication method is disclosed which includes fabricating a tamper-respondent assembly. Fabricating the tamper-respondent assembly includes providing a circuit board, and providing an enclosure mounted to the circuit board along an enclosure-to-board interface, the enclosure facilitating enclosing at least one electronic component coupled to the circuit board within a secure volume. The method further includes providing a tamper-respondent electronic circuit structure that facilitates defining the secure volume. The tamper-respondent electronic circuit structure includes one or more tamper-detect circuits, including at least one conductive trace disposed, at least in part, within the enclosure-to-board interface, and the at least one conductive trace includes stress rise regions to facilitate detecting a tamper event at the enclosure-to-board interface. Further, the method includes securing the enclosure to the circuit board using an adhesive, the adhesive contacting, at least in part, the at least one conductive trace of the one or more tamper-detect circuits within the enclosure to board interface, including at the stress rise regions of the at least one conductive trace.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Aspects of the present invention and certain features, advantages, and details thereof, are explained more fully below with reference to the non-limiting example(s) illustrated in the accompanying drawings. Descriptions of well-known materials, fabrication tools, processing techniques, etc., are omitted so as not to unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art for this disclosure. Note further that reference is made below to the drawings, which are not drawn to scale for ease of understanding, wherein the same reference numbers used throughout different figures designate the same or similar components. Also, note that numerous inventive aspects and features are disclosed herein, and unless otherwise inconsistent, each disclosed aspect or feature is combinable with any other disclosed aspect or feature as desired for a particular application, for instance, for establishing a tamper-proof enclosure-to-board interface for a tamper-respondent assembly.

Figure 1:
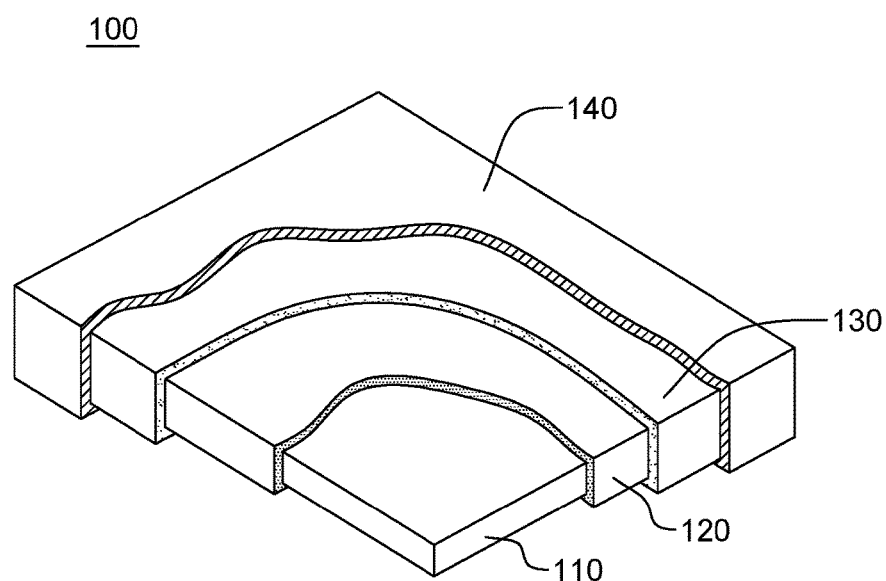
FIG. 1 is a partial cut-away of one embodiment of a tamper-proof electronic package.

Reference is first made to FIG. 1, which illustrates one approach for an electronic package 100 configured as a tamper-proof electronic package for purposes of discussion. In the depicted embodiment, an electronic assembly enclosure 110 is provided containing, for instance, an electronic assembly, which in one embodiment may include a plurality of electronic components, such as an encryption and/or decryption module and associated memory. The encryption and/or decryption module may include security-sensitive information with, for instance, access to the information stored in the module requiring use of a variable key, and with the nature of the key being stored in the associated memory within the enclosure.

In one or more implementations, a tamper-proof electronic package or tamper-respondent assembly, such as depicted, is configured or arranged to detect attempts to tamper with or penetrate into electronic assembly enclosure 110. Accordingly, electronic assembly enclosure 110 also includes, for instance, a monitor circuit which, if tampering is detected, activates an erase circuit to erase information stored within the associated memory, as well as the encryption and/or decryption module within the communications card. These components may be mounted on, and interconnected by, a multilayer circuit board, such as a printed circuit board or other multilayer substrate, and be internally or externally powered via a power supply provided within the electronic assembly enclosure.

In the embodiment illustrated, and as one example only, electronic assembly enclosure 110 may be surrounded by a tamper-detection sensor 120, an encapsulant 130, and an outer, thermally conductive enclosure 140. In one or more implementations, tamper-detection sensor 120 may include a tamper-detection laminate that is folded around electronic assembly enclosure 110, and encapsulant 130 may be provided in the form of a molding. Tamper-detection sensor 120 may include various detection layers, which are monitored through, for instance, a ribbon cable by the enclosure monitor, against attempts to penetrate enclosure 110 and damage the enclosure monitor or erase circuit, before information can be erased from the encryption module. The tamper-detection sensor may be, for example, any such article commercially available or described in various publications and issued patents, or any enhanced article such as disclosed herein.

By way of example, tamper-detection sensor 120 may be formed as a tamper-detection laminate comprising a number of separate layers with, for instance, an outermost lamination-detection layer including a matrix of, for example, diagonally-extending or sinusoidally-extending, conductive or semi-conductive lines printed onto a regular, thin insulating film. The matrix of lines forms a number of continuous conductors which would be broken if attempts are made to penetrate the film. The lines may be formed, for instance, by printing conductive traces onto the film and selectively connecting the lines on each side, by conductive vias, near the edges of the film. Connections between the lines and an enclosure monitor of the communications card may be provided via, for instance, one or more ribbon cables. The ribbon cable itself may be formed of lines of conductive material printed onto an extension of the film, if desired. Connections between the matrix and the ribbon cable may be made via connectors formed on one edge of the film. As noted, the laminate may be wrapped around the electronic assembly enclosure to define the tamper-detection sensor 120 surrounding enclosure 110.

In one or more implementations, the various elements of the laminate may be adhered together and wrapped around enclosure 110, in a similar manner to gift-wrapping a parcel, to define the tamper-detection sensor shape 120. The assembly may be placed in a mold which is then filled with, for instance, cold-pour polyurethane, and the polyurethane may be cured and hardened to form an encapsulant 130. The encapsulant may, in one or more embodiments, completely surround the tamper-detection sensor 120 and enclosure 110, and thus form a complete environmental seal, protecting the interior of the enclosure. The hardened polyurethane is resilient and increases robustness of the electronic package in normal use. Outer, thermally conductive enclosure 140 may optionally be provided over encapsulant 130 to, for instance, provide further structural rigidity to the electronic package.

When considering tamper-proof packaging, the electronic package needs to maintain defined tamper-proof requirements, such as those set forth in the National Institutes of Standards and Technology (NIST) Publication FIPS 140-2, which is a U.S. Government Computer Security Standard, used to accredit cryptographic modules. The NIST FIPS 140-2 defines four levels of security, named Level 1 to Level 4, with Security Level 1 providing the lowest level of security, and Security Level 4 providing the highest level of security. At Security Level 4, physical security mechanisms are provided to establish a complete envelope of protection around the cryptographic module, with the intent of detecting and responding to any unauthorized attempt at physical access. Penetration of the cryptographic module enclosure from any direction has a very high probability of being detected, resulting in the immediate zeroization of all plain text critical security parameters (CSPs).

To address the demands for ever-improving anti-intrusion technology, and the higher-performance encryption/decryption functions being provided, enhancements to a tamper-proof, tamper-evident packaging for one or more electronic components or assemblies are desired.

Numerous enhancements are described herein to, for instance, tamper-proof electronic packages or tamper-respondent assemblies. As noted, the numerous inventive aspects described herein may be used singly, or in any desired combination. Additionally, in one or more implementations, the enhancements described herein may be provided to work within defined space limitations for existing packages.

Disclosed hereinbelow with reference to FIGS. 2-15B are various approaches and/or enhancements to creating, for instance, a secure volume for accommodating one or more electronic components, such as one or more encryption and/or decryption modules and associated components of, for instance, a communications card or other electronic assembly to be protected.

Figure 2:
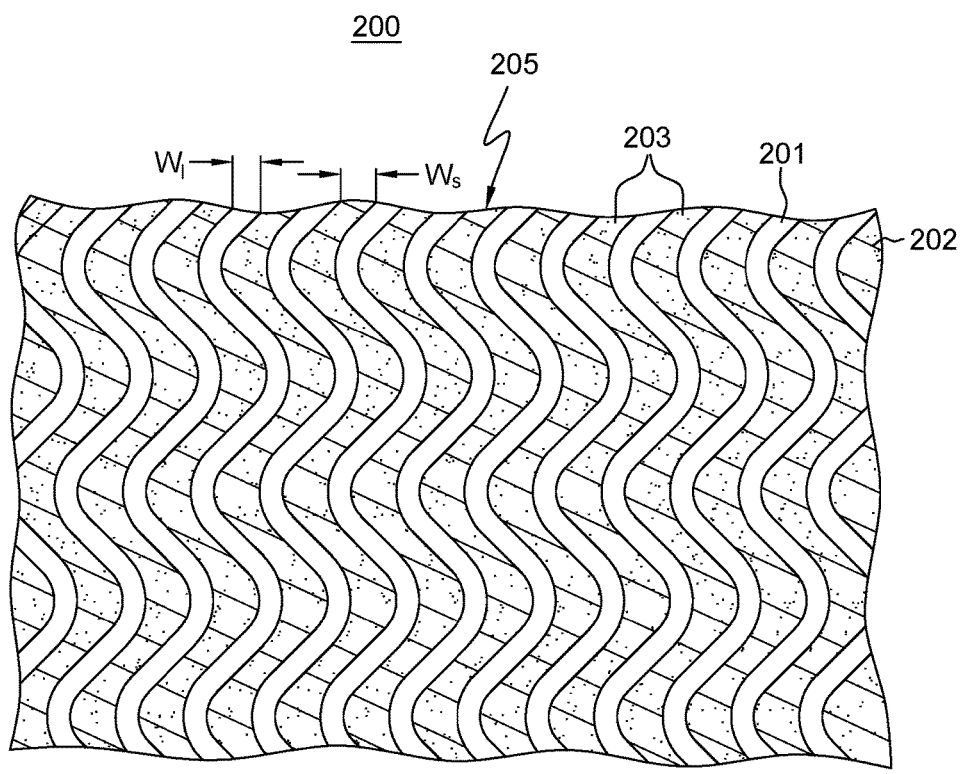
FIG. 2 depicts one embodiment of a tamper-respondent sensor with conductive lines forming, at least in part, at least one tamper-detect circuit, in accordance with one or more aspects of the present invention.

FIG. 2 depicts a portion of one embodiment of a tamper-detection layer 205 (or laser and pierce-respondent layer) of a tamper-respondent sensor 200 or security sensor, such as discussed herein. In FIG. 2, tamper-detection layer 205 includes circuit lines or traces 201 provided on one or both opposite sides of a flexible layer 202, which in one or more embodiments, may be a flexible insulating layer or film. FIG. 2 illustrates circuit lines 201 on, for instance, one side of flexible layer 202, with the traces on the opposite side of the film being, for instance, the same pattern, but (in one or more embodiments) offset to lie directly below spaces 203, between circuit lines 201. As described below, the circuit lines on one side of the flexible layer may be of a line width $W_l$ and have a pitch or line-to-line spacing $W_s$ such that piercing of the layer 205 at any point results in damage to at least one of the circuit lines traces 201. In one or more implementations, the circuit lines may be electrically connected in-series or parallel to define one or more conductors which may be electrically connected in a network to an enclosure monitor, which may, in one or more implementations, monitor the resistance of the lines. Detection of an increase, or other change, in resistance, caused by cutting or damaging one of the traces, will cause information within the encryption and/or decryption module to be erased. Providing conductive lines 201 in a pattern, such as a sinusoidal pattern, may advantageously make it more difficult to breach tamper-detection layer 205 without detection. Note, in this regard, that conductive lines 201 could be provided in any desired pattern. For instance, in an alternate implementation, conductive lines 201 could be provided as parallel, straight conductive lines, if desired, and the pattern or orientation of the pattern may vary between sides of a layer, and/or between layers.

As noted, as intrusion technology continues to evolve, anti-intrusion technology needs to continue to improve to stay ahead. In one or more implementations, as noted, the above-summarized tamper-respondent sensor 200 of FIG. 2 may be disposed over an outer surface of an enclosure, such as an enclosure described above in connection with FIG. 1. Alternatively, as described further herein, the tamper-respondent sensor may cover or line an inner surface of an enclosure to provide a secure volume about at least one electronic component to be protected. Still further, the tamper-respondent sensor, or more particularly, the tamper-detect circuit(s) of the sensor, could be embedded within a multilayer circuit board described below.

In one or more aspects, disclosed herein is a tamper-respondent sensor 200 with circuit lines 201 having reduced line widths $W_l$ of, for instance, 200 µm, or less, such as less than or equal to 100 µm, or even more particularly, in the range of 30-70 µm. This is contrasted with conventional trace widths, which are typically on the order of 250 µm or larger. Commensurate with reducing the circuit line width $W_l$, line-to-line spacing width $W_s$ 203 is also reduced to less than or equal to 200 µm, such as less than or equal to 100 µm, or for instance, in a range of 30-70 µm. Advantageously, by reducing the line width $W_l$ and line-to-line spacing $W_s$ of circuit lines 201 within tamper-respondent sensor 200, the circuit line width and pitch is on the same order of magnitude as the smallest intrusion instruments currently available, and therefore, any intrusion attempt will necessarily remove a sufficient amount of a circuit line(s) to cause resistance to change, and thereby the tamper intrusion to be detected. Note that, by making the circuit line width of the smaller dimensions disclosed herein, any cutting or damage to the smaller-dimensioned circuit line will also be more likely to be detected, that is, due to a greater change in resistance. For instance, if an intrusion attempt cuts a 100 µm width line, it is more likely to reduce the line width sufficiently to detect the intrusion by a change in resistance. A change in a narrower line width is more likely to result in a detectable change in resistance, compared with, for instance, a 50% reduction in a more conventional line width of 350 µm to, for instance, 175 µm. The smaller the conductive circuit line width becomes, the more likely that a tampering of that line will be detected.

Note also that a variety of materials may advantageously be employed to form the circuit lines when implemented using resistance monitoring. For instance, the circuit lines may be formed of a conductive ink (such as a carbon-loaded conductive ink) printed onto one or both opposite sides of one or more of the flexible layers 202 in a stack of such layers. Alternatively, a metal or metal alloy could be used to form the circuit lines, such as copper, silver, intrinsically conductive polymers, carbon ink, or nickel-phosphorus (NiP), such as Omega-Ply®, offered by Omega Technologies, Inc. of Culver City, Calif. (USA), or nickel-chrome, such as Ticer™ offered by Ticer Technologies, Chandler, Ariz. (USA). Note that the process employed to form the fine circuit lines or traces on the order described herein is dependent, in part, on the choice of material used for the circuit lines. For instance, if copper circuit lines are being fabricated, then additive processing, such as plating up copper traces, or subtractive processing, such as etching away unwanted copper between trace lines, may be employed. By way of further example, if conductive ink is employed as the circuit line material, fine circuit lines on the order disclosed herein can be achieved by focusing on the rheological properties of the conductive ink formulation. Further, rather than simple pneumatics of pushing conductive ink through an aperture in a stencil with a squeegee, the screen emulsion may be characterized as very thin (for instance, 150 to 200 µm), and a squeegee angle may be used such that the ink is sheared to achieve conductive ink breakaway rather than pumping the conductive ink through the screen apertures. Note that the screen for fine line width printing such as described herein may have the following characteristics in one specific embodiment: a fine polyester thread for both warp and weave on the order of 75 micrometers; a thread count between 250-320 threads per inch; a mesh thickness of, for instance, 150 micrometers; an open area between threads that is at least 1.5× to 2.0× the conductive ink particle size; and to maintain dimensional stability of the print, the screen snap-off is kept to a minimum due the screen strain during squeegee passage.

In a further aspect, the flexible layer 202 itself may be further reduced in thickness from a typical polyester layer by selecting a crystalline polymer to form the flexible layer or substrate. By way of example, the crystalline polymer could include polyvinylidene difluoride (PVDF), or Kapton, or other crystalline polymer material. Advantageously, use of a crystalline polymer as the substrate film may reduce thickness of the flexible layer 202 to, for instance, 2 mils thick from a more conventional amorphous polyester layer of, for instance, 5-6 mils. A crystalline polymer can be made much thinner, while still maintaining structural integrity of the flexible substrate, which advantageously allows for far more folding, and greater reliability of the sensor after folding. Note that the radius of any fold or curvature of the sensor is necessarily constrained by the thickness of the layers comprising the sensor. Thus, by reducing the flexible layer thickness to, for instance, 2 mils, then in a four tamper-detection layer stack, the stack thickness can be reduced from, for instance, 20 mils in the case of a typical polyester film, to 10 mils or less with the use of crystalline polymer films.

Figure 3A:
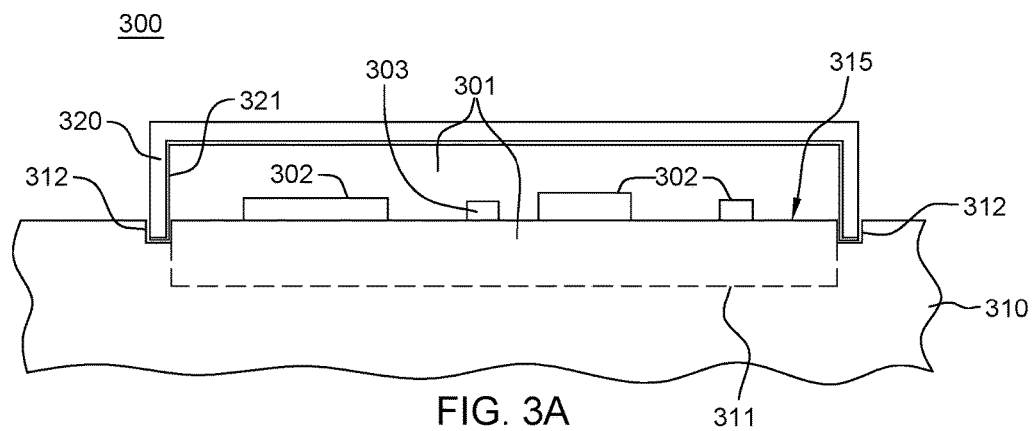
FIG. 3A is a cross-sectional elevational view of another embodiment of a tamper-proof electronic package, or tamper-respondent assembly, which includes (in part) an enclosure, and a multilayer circuit board with an embedded tamper-detect circuit, in accordance with one or more aspects of the present invention.
Figure 3B:
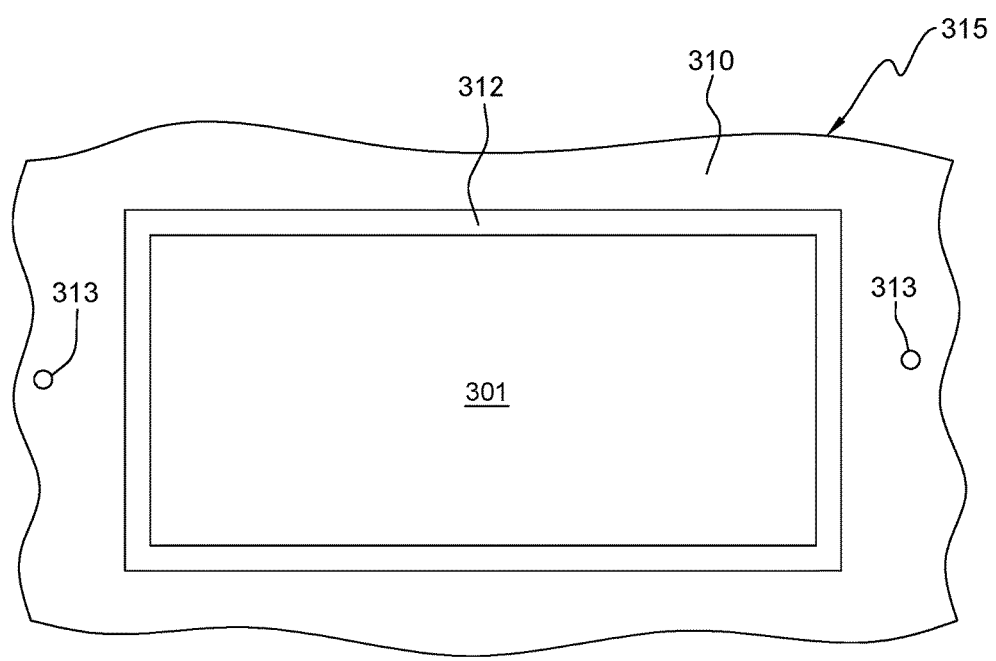
FIG. 3B is a top plan view of the multilayer circuit board of FIG. 3A, depicting one embodiment of the secure volume defined, in part, within the multilayer circuit board, in accordance with one or more aspects of the present invention.

FIGS. 3A & 3B depict one embodiment of a tamper-proof electronic package 300, or tamper-respondent assembly, which includes one or more electronic components, such as a circuit 315 and/or electronic devices (or elements) 302 to be protected, in accordance with one or more further aspects of the present invention.

Referring collectively to FIGS. 3A & 3B, circuit 315 resides on or is embedded within a multilayer circuit board 310, which also has an embedded tamper-respondent sensor 311 that facilitates defining, in part, a secure volume 301 associated with multilayer circuit board 310 that (in one or more embodiments) extends into multilayer circuit board 310. In particular, in the embodiment of FIGS. 3A & 3B, secure volume 301 may exist partially within multilayer circuit board 310, and partially above multilayer circuit board 310. One or more electronic devices 302 are mounted to multilayer circuit board 310 within secure volume 301 and may include, for instance, one or more encryption modules and/or decryption modules, and/or associated components, to be protected within the tamper-proof electronic package. In one or more implementations, the one or more electronic components to be protected may include, for instance, a secure communications card of a computer system.

Tamper-proof electronic package 300 further includes an enclosure 320, such as a pedestal-type enclosure, mounted to multilayer circuit board 310 within, for instance, a continuous groove (or trench) 312 formed within an upper surface of multilayer circuit board 310, and secured to the multilayer circuit board 310 via, for instance, a structural adhesive disposed within continuous groove 312. In one or more embodiments, enclosure 320 may include a thermally conductive material and operate as a heat sink for facilitating cooling of the one or more electronic components 302 within the secure volume. A security mesh or tamper-respondent sensor 321 may be associated with enclosure 320, for example, wrapping around the inner surface of enclosure 320, to facilitate defining, in combination with tamper-respondent sensor 311 embedded within multilayer circuit board 310, secure volume 301. In one or more implementations, tamper-respondent sensor 321 may extend down into continuous groove 312 in multilayer circuit board 310 and may, for instance, even wrap partially or fully around the lower edge of enclosure 320 within continuous groove 312 to provide enhanced tamper detection where enclosure 320 couples to multilayer circuit board 310. In one or more implementations, enclosure 320 may be securely affixed to multilayer circuit board 310 using, for instance, a bonding material such as an epoxy or other adhesive.

Briefly described, tamper-respondent sensor 321 may include, in one or more examples, one or more tamper-detection layers which include circuit lines or traces provided on one or both sides of a flexible layer, which in one or more implementations, may be a flexible insulating layer or film. The circuit lines on one or both sides of the flexible layer may be of a line width and have a pitch or line-to-line spacing such that piercing of the layer at any point results in damage to one or more of the circuit lines or traces. In one or more implementations, the circuit lines may define one or more conductors which may be electrically connected in a network to an enclosure monitor or detector 303, which monitors, for instance, resistance on the lines, or as described below, in the case of conductors, may monitor for a nonlinearity, or non-linear conductivity change, on the conductive lines. Detection of a change in resistance or a nonlinearity caused by cutting or damaging one or more of the lines, will cause information within the secure volume to be automatically erased. The conductive lines of the tamper-respondent sensor may be in any desired pattern, such as a sinusoidal pattern, to make it more difficult to breach the tamper-detection layer without detection.

For resistive monitoring, a variety of materials may be employed to form the circuit lines. For instance, the circuit lines may be formed of a metal or metal alloy, such as copper, or silver, or could be formed, for example, of an intrinsically-conductive polymer, carbon ink, or nickel phosphorous (NiP), or Omega-ply®, offered by Omega Technologies, Inc., of Culver City, Calif. (USA), or Ticer™, offered by Ticer Technologies, Chandler, Ariz. (USA). The process employed to form the fine circuit lines or traces is dependent, in part, on the choice of materials used for the circuit lines. For instance, if copper circuit lines are fabricated, then additive processing, such as plating of copper traces, or subtractive processing, such as etching away unwanted copper between trace lines, may be employed.

As noted, in one or more implementations, the circuit lines of the tamper-respondent sensor(s) lining the inner surface(s) of enclosure 320, or even printed directly onto one or more layers formed over the inner surface of enclosure 320, may be connected to define one or more detect networks.

If a flexible layer is used over the inner surface of enclosure 320, then the flexible layer may be formed of a crystalline polymer material. For instance, the crystalline polymer could include polyvinylidene difluoride (PVDF), or Kapton, or other crystalline polymer material. Advantageously, a crystalline polymer may be made much thinner, while still maintaining structural integrity of the flexible substrate, which also allows for enhanced folding, and greater reliability of the sensor after folding.

As depicted in FIG. 3B, one or more external circuit connection vias 313 may be provided within multilayer circuit board 310 for electrically connecting to the one or more electronic components within secure volume 301. These one or more external circuit connection vias 313 may electrically connect to one or more external signal lines or planes (not shown) embedded within multilayer circuit board 310 and extending, for instance, into a secure base region of (or below) secure volume 301, as explained further below. Electrical connections to and from secure volume 301 may be provided by coupling to such external signal lines or planes within the multilayer circuit board 310.

As noted, secure volume 301 may be sized to house one or more electronic components to be protected, and may be constructed to extend into multilayer circuit board 310. In one or more implementations, multilayer circuit board 310 includes electrical interconnect within the secure volume 301 defined in the board, for instance, for electrically connecting one or more tamper-detection layers of the embedded tamper-respondent sensor 311 to associated monitor circuitry also disposed within secure volume 301, along with, for instance, one or more daughter cards, such as memory DIMMs, PCIe cards, processor cards, etc.

Note that the packaging embodiment depicted in FIGS. 3A & 3B is presented by way of example only. Other configurations of enclosure 320, or multilayer circuit board 310 may be employed, and/or other approaches to coupling enclosure 320 and multilayer circuit board 310 may be used. For instance, in one or more alternate implementations described herein, enclosure 320 may be securely affixed to an upper surface of multilayer circuit board 310 (without a continuous groove) using, for instance, a structural bonding material such as an epoxy or other adhesive.

Figure 4:
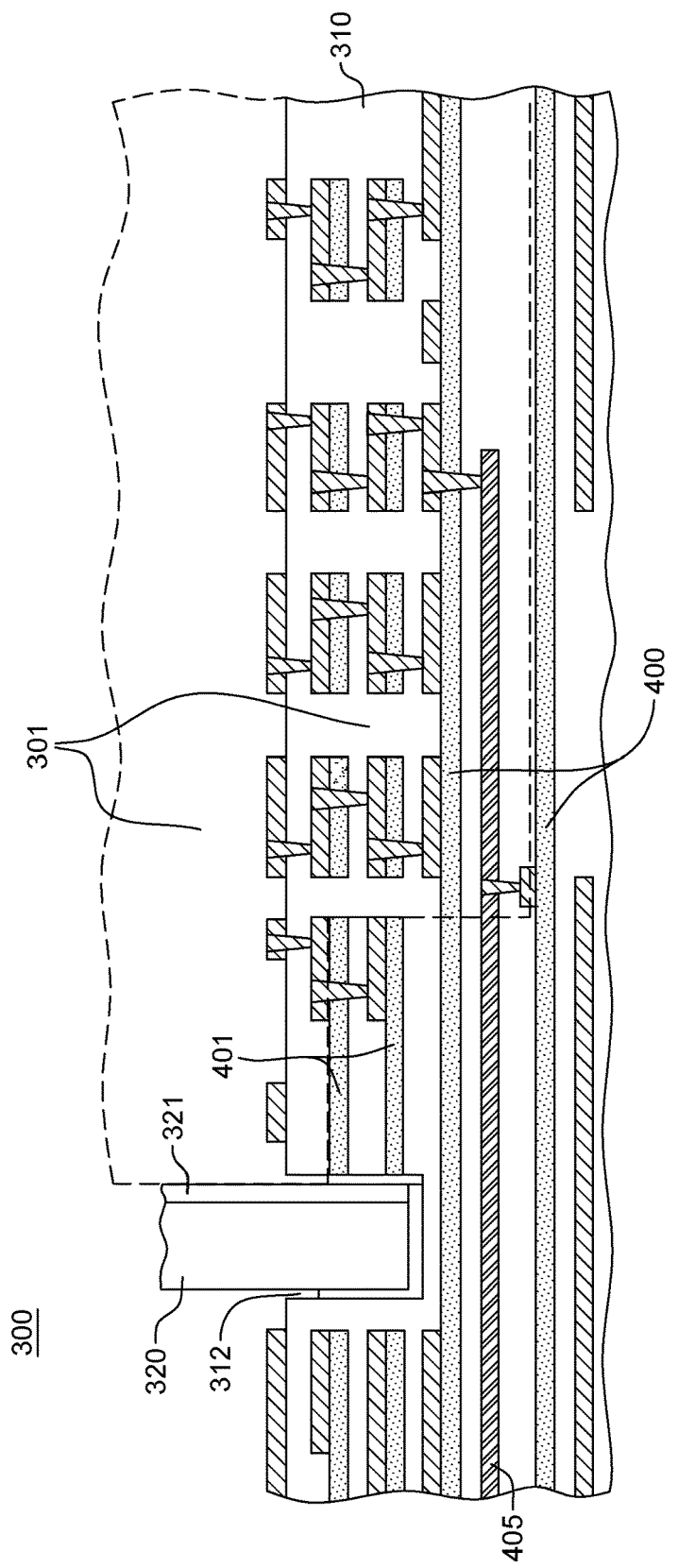
FIG. 4 is a partial cross-sectional elevational view of a more detailed embodiment of the tamper-respondent assembly of FIGS. 3A & 3B including (in part) an enclosure and a multilayer circuit board with embedded tamper-detect circuit, in accordance with one or more aspects of the present invention.

By way of further example, FIG. 4 depicts a partial cross-sectional elevational view of a more detailed embodiment of tamper-proof electronic package 300, and in particular, of multilayer circuit board 310, to which enclosure 320 is secured. In this configuration, the embedded tamper-respondent sensor includes multiple tamper-detection layers including, by way of example, at least one tamper-detection mat (or base) layer 400, and at least one tamper-detection frame 401. In the example depicted, two tamper-detection mat layers 400 and two tamper-detection frames 401 are illustrated, by way of example only. The lower-most tamper-detection mat layer 400 may be a continuous sense or detect layer extending completely below the secure volume being defined within and/or above multilayer circuit board 310. One or both tamper-detection mat layers 400 below secure volume 301 may be partitioned into multiple circuit zones. Within each tamper-detection mat layer, or more particularly, within each circuit zone of each tamper-detection mat layer, multiple circuits or conductive traces may be provided in any desired configuration. Further, the conductive traces within the tamper-detection layers may be implemented as, for instance, a resistive layer.

As illustrated, one or more external signal lines or planes 405 may enter secure volume 301 between, in one embodiment, two tamper-detection mat layers 400, and then electrically connect upwards into the secure volume 301 through one or more conductive vias, arranged in any desired location and pattern. In the configuration depicted, the one or more tamper-detection frames 401 are disposed at least inside of the area defined by continuous groove 312 accommodating the base of enclosure 320. Together with the tamper-respondent sensor(s) 321 associated with enclosure 320, tamper-detection frames 401, and tamper-detection mat layers 400, define secure volume 301, which may extend, in part, into multilayer circuit board 310. With secure volume 301 defined, in part, within multilayer circuit board 310, the external signal line(s) 405 may be securely electrically connected to, for instance, the one or more electronic components mounted to, or of, multilayer circuit board 310 within secure volume 301. In addition, secure volume 301 may accommodate electrical interconnection of the conductive traces of the multiple tamper-detection layers 400, 401, for instance, via appropriate monitor circuitry.

Added security may be provided by extending tamper-detection mat layers 400 (and if desired, tamper-detection frames 401) outward past the periphery of enclosure 320. In this manner, a line of attack may be made more difficult at the interface between enclosure 320 and multilayer circuit board 310 since the attack would need to clear, for instance, tamper-detection mat layers 400, the enclosure 320, as well as the tamper-detection frames 401 of the embedded tamper-detect circuit.

Numerous variations on multilayer circuit board 310 of FIGS. 3A-4 are possible. For instance, in one embodiment, the embedded tamper-detect circuit may include one or more tamper-detection mat layers 400 and one or more tamper-detection frames 401, such as described above, and a tri-plate structure comprising one or more external signal lines or layers sandwiched between an upper ground plane and a lower ground plane. In this configuration, high-speed transfer of signals to and from the secure volume, and in particular, to and from the one or more electronic components resident within the secure volume, would be facilitated.

Note also that, once the secure volume is defined in part within multilayer circuit board 310, conductive vias within the secure volume between layers of multilayer circuit board 310 may be either aligned, or offset, as desired, dependent upon the implementation. Alignment of conductive vias may facilitate, for instance, providing a shortest connection path, while offsetting conductive vias between layers may further enhance security of the tamper-proof electronic package by making an attack into the secure volume through or around one or more tamper-detection layers of the multiple tamper-detection layers more difficult.

The tamper-detection layers of the embedded tamper-detect circuit formed within the multilayer circuit board of the electronic circuit or electronic package may include multiple conductive traces or lines formed between, for instance, respective sets of input and output contacts or vias at the trace termination points. Any pattern and any number of conductive traces or circuits may be employed in defining a tamper-detection layer or a tamper-detection circuit zone within a tamper-detection layer. For instance, 4, 6, 8, etc., conductive traces may be formed in parallel (or otherwise) within a given tamper-detection layer or circuit zone between the respective sets of input and output contacts to those conductive traces.

Figure 5:
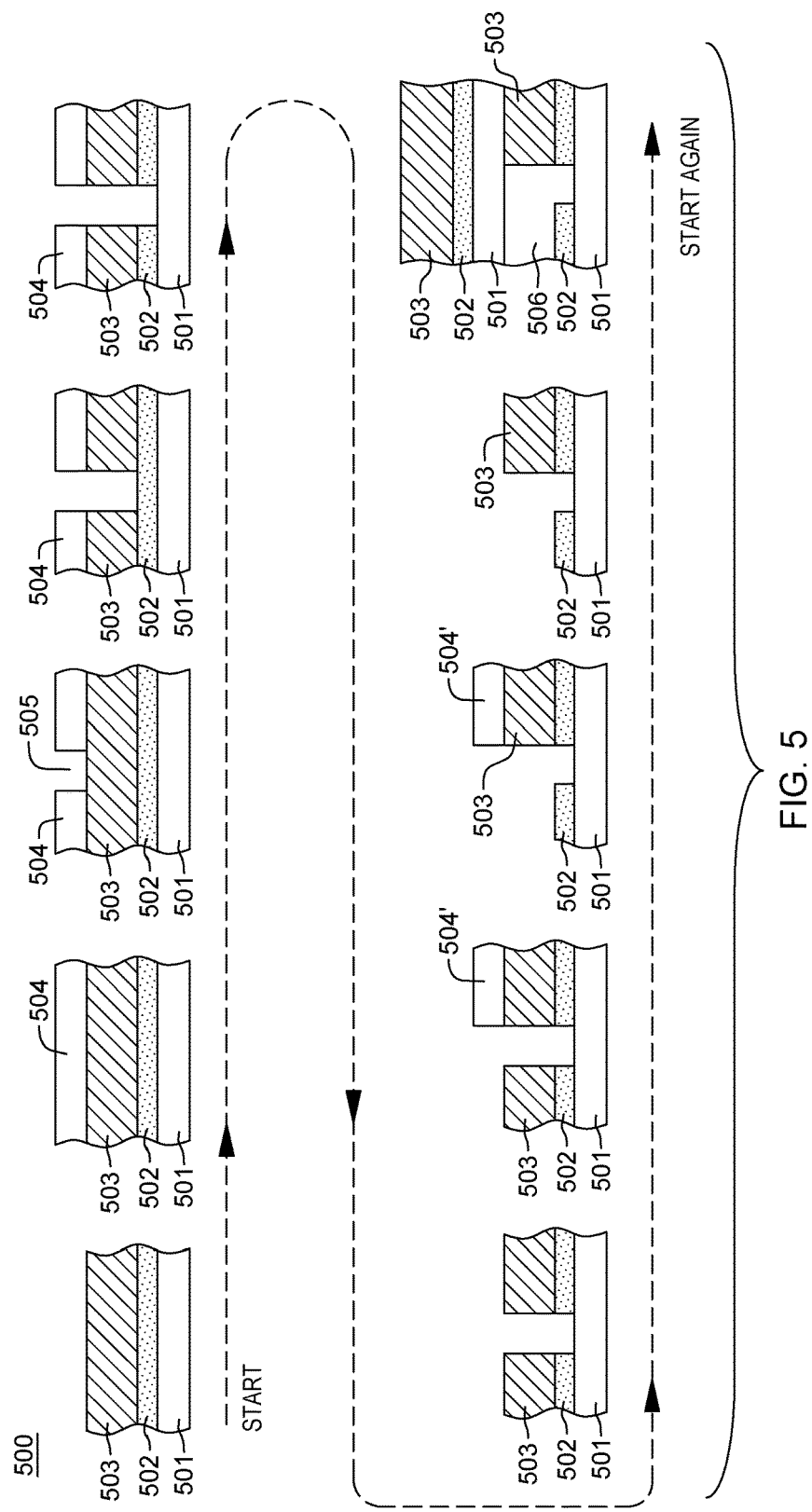
FIG. 5 depicts one embodiment of a process of fabricating a multilayer circuit board with an embedded tamper-detect circuit, in accordance with one or more aspects of the present invention.

In one or more implementations, the multilayer circuit board may be a multilayer wiring board or printed circuit board formed, for instance, by building up the multiple layers of the board. FIG. 5 illustrates one embodiment for forming and patterning a tamper-detection layer within such a multilayer circuit board.

As illustrated in FIG. 5, in one or more implementations, a tamper-detection layer, such as a tamper-detection mat layer or a tamper-detection frame disclosed herein, may be formed by providing a material stack comprising, at least in part, a structural layer 501, such as a pre-preg (or pre-impregnated) material layer, a trace material layer 502 for use in defining the desired trace patterns, and an overlying conductive material layer 503, to be patterned to define conductive contacts or vias electrically connecting to the pattern of traces being formed within the trace material layer 502, for instance, at trace terminal points. In one or more implementations, the trace material layer 502 may include nickel phosphorous (NiP), and the overlying conductive layer 503 may include copper. Note that these materials are identified by way of example only, and that other trace and/or conductive materials may be used within the build-up 500.

A first photoresist 504 is provided over build-up 500, and patterned with one or more openings 505, through which the overlying conductive layer 503 may be etched. Depending on the materials employed, and the etch processes used, a second etch process may be desired to remove portions of trace material layer 502 to define the conductive traces of the subject tamper-detection layer. First photoresist 504 may then be removed, and a second photoresist 504' is provided over the conductive layer 503 features to remain, such as the input and output contacts. Exposed portions of conductive layer 503 are then etched, and the second photoresist 504' may be removed, with any opening in the layer being filled, for instance, with an adhesive (or pre-preg) 506 and a next build-up layer is provided, as shown. Note that in this implementation, most of overlying conductive layer 503 is etched away, with only the conductive contacts or vias remaining where desired, for instance, at the terminal points of the traces formed within the layer by the patterning of the trace material layer 502. Note that any of a variety of materials may be employed to form the conductive lines or traces within a tamper-detection layer. Nickel-phosphorous (NiP) is particularly advantageous as a material since it is resistant to contact by solder, or use of a conductive adhesive to bond to it, making it harder to bridge from one circuit or trace to the next during an attempt to penetrate into the protected secure volume of the electronic circuit. Other materials which could be employed include OhmegaPly®, offered by Ohmega Technologies, Inc., of Culver City, Calif. (USA), or Ticer™, offered by Ticer Technologies of Chandler, Ariz. (USA).

The trace lines or circuits within the tamper-detection layers, and in particular, the tamper-detection circuit zones, of the embedded tamper-detect circuit, along with the tamper detector monitoring the enclosure, may be electrically connected to detect or compare circuitry provided, for instance, within secure volume 301 (FIG. 3A) of the tamper-proof electronic package. The detect circuitry may include various bridges or compare circuits, and conventional printed wiring board electrical interconnect inside secure volume 301 (FIG. 3A), for instance, located within the secure volume defined by the tamper-detection frames 401 (FIG. 4), and the tamper-detection mat layers 400 (FIG. 4).

Note that advantageously, different tamper-detection circuit zones on different tamper-detection layers may be electrically interconnected into, for instance, the same detect circuitry. Thus, any of a large number of interconnect configurations may be possible. For instance, if each of two tamper-detection mat layers contains 30 tamper-detection circuit zones, and each of two tamper-detection frames contains 4 tamper-detection circuit zones, then, for instance, the resultant 68 tamper-detection circuit zones may be connected in any configuration within the secure volume to create the desired arrangement of circuit networks within the secure volume being monitored for changes in resistance or tampering. Note in this regard, that the power supply or battery for the tamper-respondent sensor(s) may be located internal or external to the secure volume, with the sensor being configured to trip and destroy any protected or critical data if the power supply or battery is tampered with.

Figure 6:
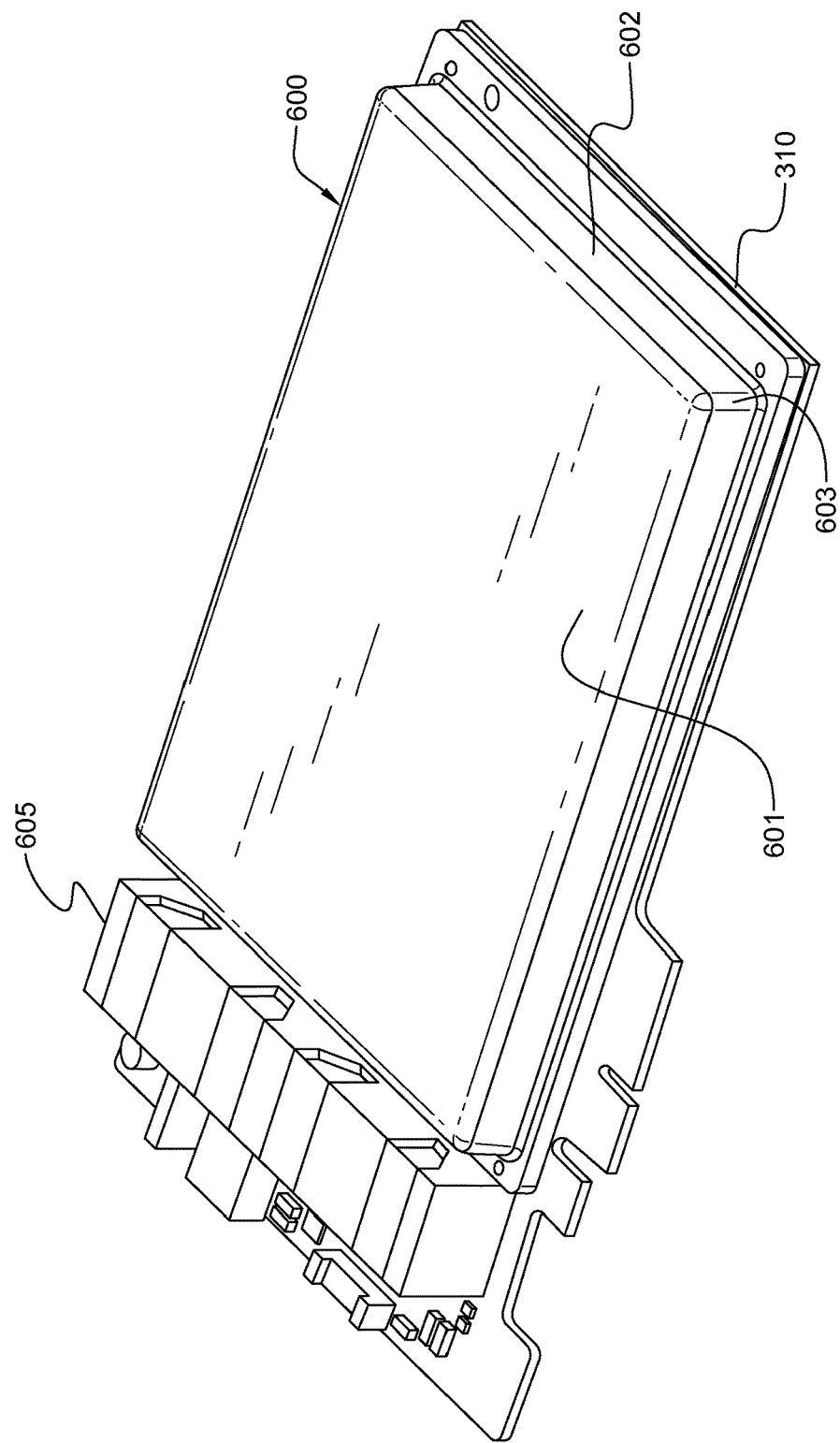
FIG. 6 is an isometric view of one embodiment of a tamper-respondent assembly, in accordance with one or more aspects of the present invention.

By way of further example, an isometric view of one embodiment of a tamper-proof electronic package is depicted in FIG. 6, wherein an enclosure 600 (such as enclosure 320 of FIG. 3A) is shown sealed to multilayer circuit board 310 to define a secure volume about one or more electronic components, as described herein. In the embodiment depicted, enclosure 600 may be formed of a thermally conductive material, and includes a main surface 601 and sidewall(s) 602 which include sidewall corners 603. An inner surface of enclosure 600 would include an inner main surface, and an inner sidewall surface corresponding to main surface 601 and sidewall(s) 602 respectively, with the inner main surface and inner sidewall surfaces being covered, at least in part, by one or more tamper-respondent sensors, such as described above. A power supply 605 or battery for the tamper-respondent sensor may be located, as depicted in this embodiment, external to the secure volume, with the tamper detector being configured to trip and destroy any protected or critical data if the power supply or battery is tampered with. Enclosure 600 may be adhered to multilayer circuit board 310, which as noted herein, may include its own tamper protection.

Figure 7A:
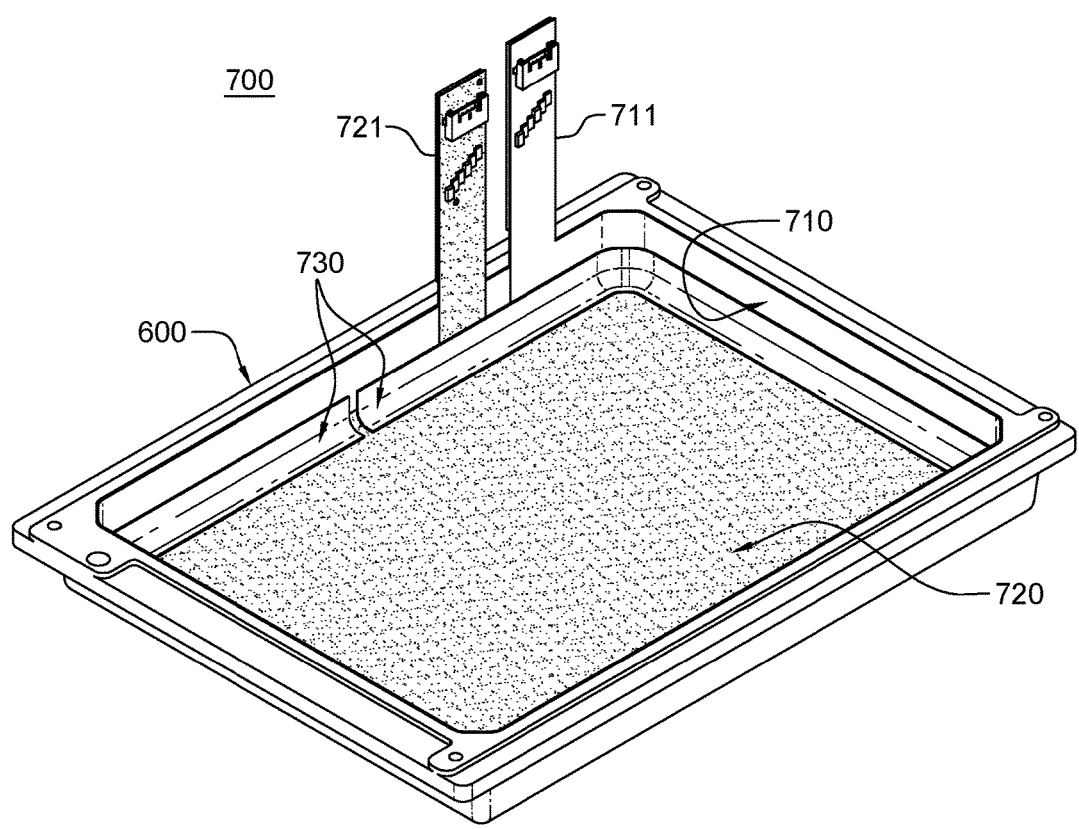
FIG. 7A depicts an underside, perspective view of one embodiment of a tamper-respondent assembly comprising an enclosure and multiple tamper-respondent sensors, in accordance with one or more aspects of the present invention.
Figure 7B:
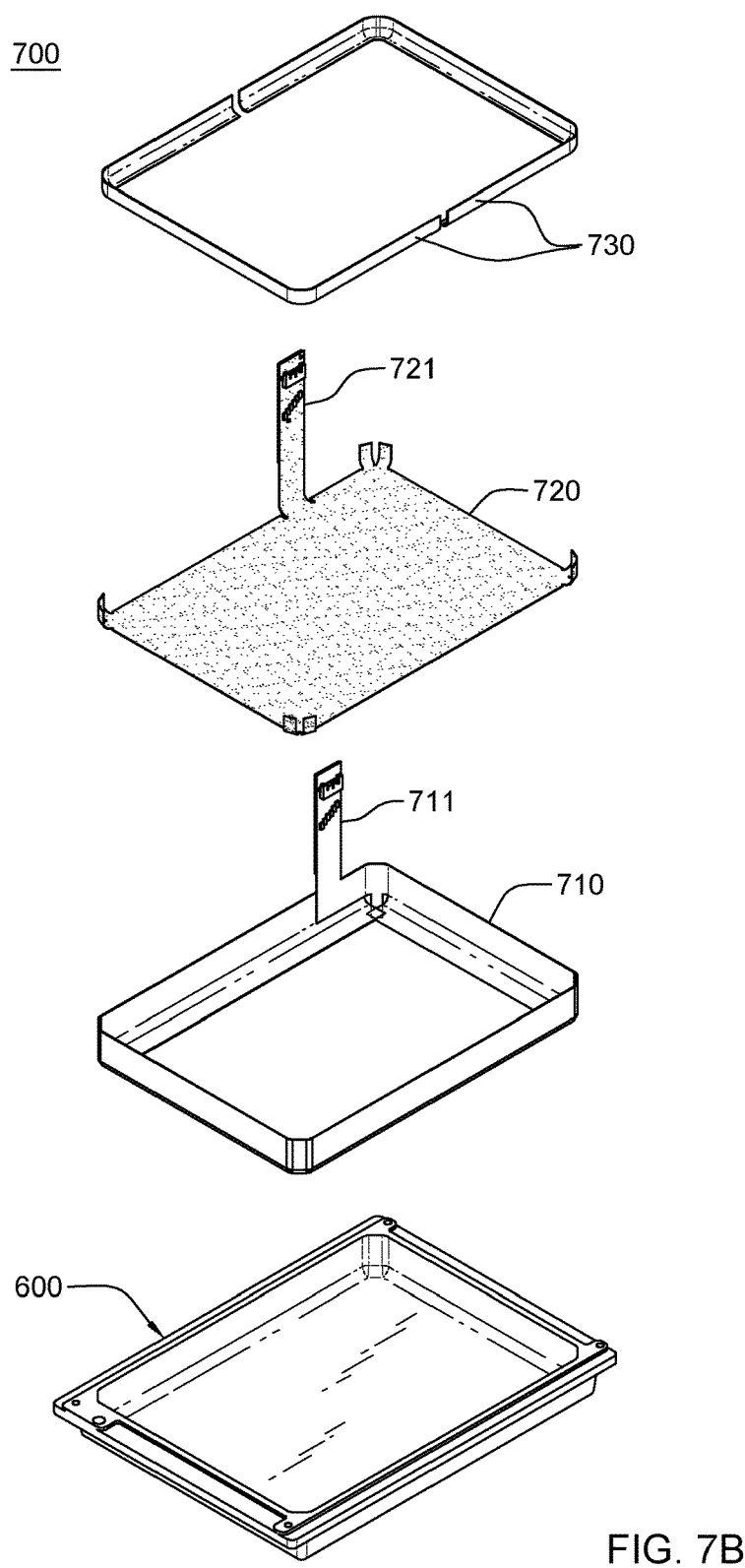
FIG. 7B depicts an exploded view of the tamper-respondent assembly of FIG. 7A, in accordance with one or more aspects of the present invention.

FIGS. 7A & 7B depict underside, isometric views of one embodiment of a tamper-respondent assembly employing an enclosure 600. Referring collectively to FIGS. 7A & 7B, in one or more implementations, tamper-respondent assembly 700 includes enclosure 600 which, as noted, is to enclose, at least in part, one or more electronic components or an electronic assembly to be protected, and associated with, for instance, a multilayer circuit board. Enclosure 600 includes an inner main surface, and an inner-sidewall surface including at least one inner-sidewall corner, such as described above in connection with FIG. 6. Further, tamper-respondent assembly 700 includes a tamper-respondent electronic circuit structure which includes at least one tamper-respondent sensor mounted to and covering, at least in part, the inner surface(s) of enclosure 600. As explained further below, the tamper-respondent sensor(s) is configured so as to facilitate good contact, and good adhesion, of the sensor to the inner surfaces of the enclosure, such as, for instance, the one or more inner-sidewall corners of the enclosure 600, to provide secure coverage of the tamper-respondent sensor(s) over the inner surface(s) of the enclosure.

As illustrated, in one or more implementations, the tamper-respondent electronic circuit structure associated with enclosure 600 may include an inner-sidewall tamper-respondent (or tamper-detect) sensor 710 and an inner main surface tamper-respondent (or tamper-detect) sensor 720, along with a security band or element 730. In the illustrated example, inner-sidewall tamper-respondent sensor 710 may be formed with an integrated flex ribbon cable or extension 711 to facilitate electrical connection of the at least one resistive network within inner-sidewall tamper-respondent sensor 710 to appropriate monitor circuitry (not shown) disposed within, for instance, the secure volume defined, at least in part, by the tamper-respondent assembly of FIGS. 7A & 7B. Similarly, inner main surface tamper-respondent sensor 720 may be configured with an integrated flex ribbon cable or extension 721 to facilitate electrical connection of inner main surface tamper-respondent sensor 720 to the monitor circuitry, as well. A bonding agent (discussed below), such as a thermoset adhesive, may be employed to adhere inner-sidewall tamper-respondent sensor 720 to the inner-sidewall surface and to inner-sidewall corners. A similar adhesive could be used to adhere inner main surface tamper-respondent sensor 720 to inner main surface and to inner-sidewall tamper-respondent sensor 710 where the sensors overlap. Security band 730 may further be adhesively secured over the overlap between inner main surface tamper-respondent sensor 720 and inner-sidewall tamper-respondent sensor 710 covering, in one or more implementations, transition regions between the inner-sidewall surface and the inner main surface around the inner perimeter of electronics enclosure 600.

Note that, in the example provided in FIGS. 7A & 7B, inner-sidewall tamper-respondent sensor 710 and inner main surface tamper-respondent sensor 720 are discrete tamper-respondent sensors that overlap, at least in part, and facilitate defining a secure volume about the at least one electronic component to be protected. For instance, the secure volume may be defined by flipping over and securing the illustrated tamper-respondent assembly of FIGS. 7A & 7B to a multilayer circuit board with an embedded tamper-respondent sensor, such as described above.

By way of further enhancement, increased protection against and/or sensitivity to a tamper event may be desired at or adjacent to, the enclosure-to-board interface. Any attempt to remove the enclosure from the board needs to be detected by the circuitry monitoring the tamper-respondent assembly. In particular, enhancements are provided herein to protect against an attack at the enclosure-to-board interface, and/or to facilitate detection of such an attack by the tamper-respondent electronic circuit structure providing, or defining, the secure volume of the tamper-respondent assembly.

Figure 8:
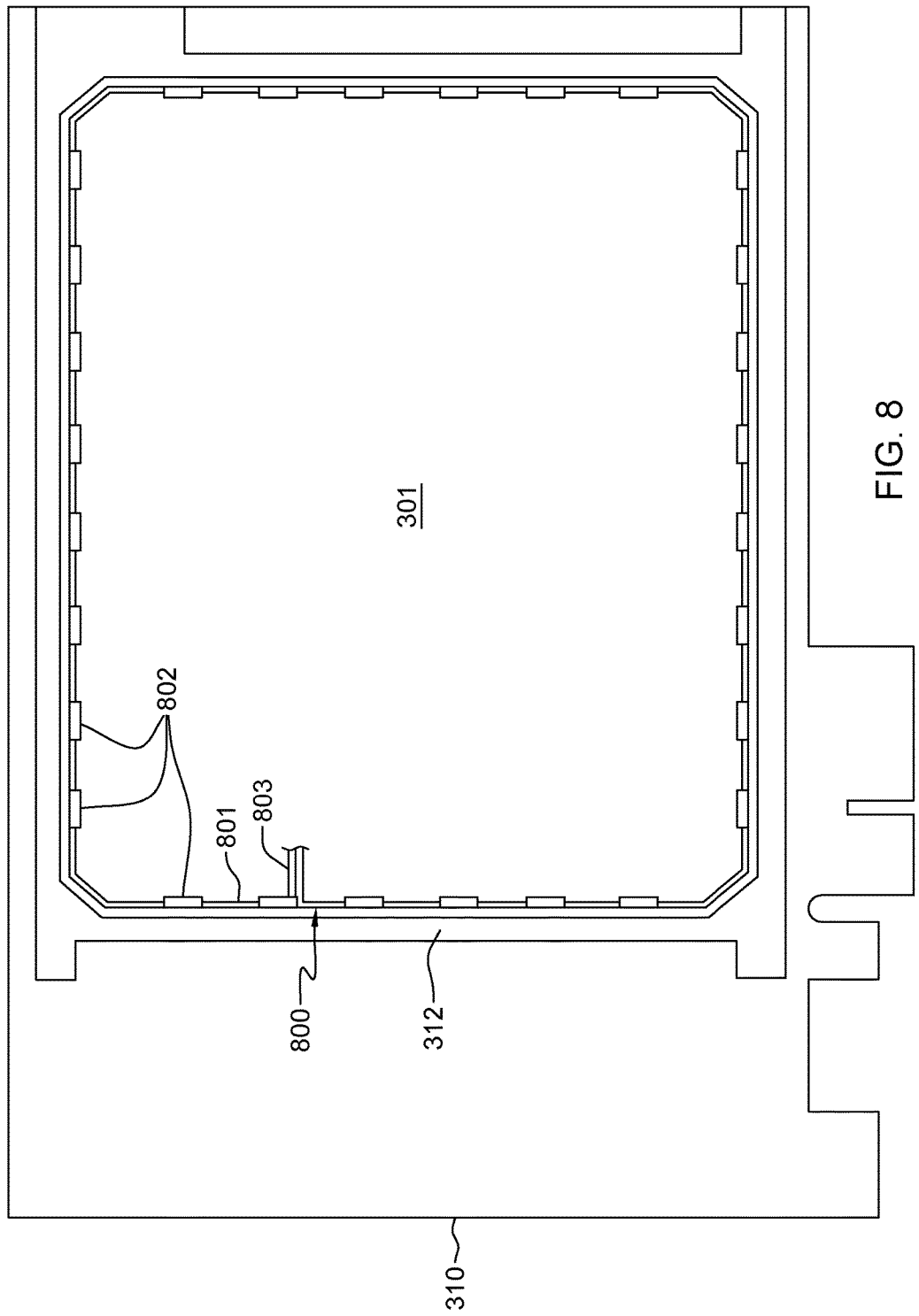
FIG. 8 is a plan view of one embodiment of the circuit board of FIGS. 3A & 3B shown with a tamper-detect circuit of a tamper-respondent electronic circuit structure, in accordance with one or more aspects of the present invention.
Figure 9:
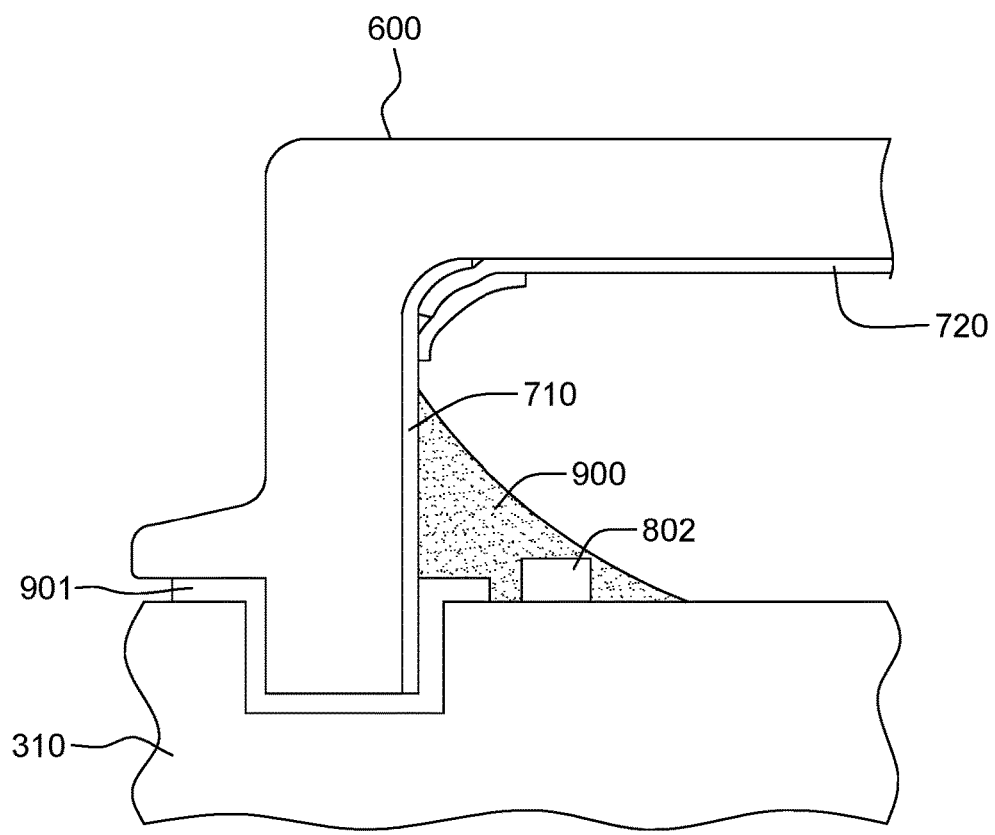
FIG. 9 is a partial cross-sectional elevational view of one embodiment of a tamper-respondent assembly such as depicted in FIG. 8, shown with an adhesive securing (in part) the enclosure to the circuit board at an inner periphery of the enclosure-to-board interface, and covering, at least in part, the tamper-detect circuit, in accordance with one or more aspects of the present invention.

By way of example, FIGS. 8 & 9 depict a tamper-respondent assembly which includes, for instance, multilayer circuit board 310 with a continuous groove or trench 312 configured and sized to receive an edge of enclosure 600 when the enclosure is mounted to multilayer circuit board 310. Secure volume 301 is defined between, for instance, enclosure 600 and multilayer circuit board 310 by a tamper-respondent electronic circuit structure, which may include, for instance, an inner side wall tamper-respondent sensor 710 (FIGS. 7A & 7B), an inner surface tamper-respondent sensor 720 (FIGS. 7A & 7B), and one or more embedded tamper-respondent sensors, such as described above.

As depicted in FIG. 8, the tamper-respondent assembly, and more particularly, the tamper-respondent electronic circuit structure of the assembly, further includes in one or more embodiments, a tamper-detect circuit 800 disposed along the inside periphery of continuous groove 312, at the inner periphery of the enclosure-to-board interface (FIG. 9). By way of example, tamper-detect circuit 800 includes circuit lines 801 which electrically interconnect, for instance, in series, a plurality of surface-mount components, such as resistors 802, which may be zero-ohm, surface-mount technology (SMT) resistors. By way of example, a zero-ohm resistor might include a surface-mount wire segment that is electrically connected at its ends to respective contact pads on the upper surface of the circuit board. The depicted ring of zero-ohm resistors, components or other structures, of tamper-detect circuit 800 may, in one or more implementations, electrically connect 803 to monitor circuitry (not shown) of the tamper-respondent assembly disposed within secure volume 301. By locating tamper-detect circuit 800, with the plurality of resistors 802 or other components, close to continuous groove 312, an adhesive 900 may be applied to the inner surface of the enclosure 600 and inner-sidewall tamper-respondent sensor 710 subassembly, so as to contact, and even cover, at least in part, the tamper-detect circuit structure 800 with mounting of enclosure 600 to circuit board 310. Note that adhesive 900 may be the same or a different adhesive than structural adhesive 901 used within continuous groove 312 to secure enclosure 600 to multilayer circuit board 310. In one or more embodiments, adhesive 900 and adhesive 901 may be different adhesives with different material properties, which further facilitates providing enhanced protection against a chemical attack at the enclosure 600 to multilayer circuit board 310 interface.

Note that the surface-mount components within tamper-detect circuit 800 may include the same or different types of surface-mount components. Any component which provides structure for adhesive 900 to affix to, and which may be broken away from respective contact pads of tamper-detect circuit 800, may potentially be used, with zero-ohm resistors or wire segments being one type of component, presented by way of example only.

Advantageously, in one or more aspects, tamper-detect circuit 800 may be electrically connected in-series between a power source and the monitor circuitry of the tamper-respondent assembly. In such a configuration, no additional power is required for monitoring tamper-detect circuit 800 since the monitor circuitry already monitor for loss of power from the power source. Thus, any intrusion attempt which results in breaking or open-circuiting tamper-detect circuit 800 is automatically detected as an intrusion event by the monitor circuitry through the loss of power. Thus, tamper intrusion detection is achieved without adding an additional sensing device, power comparator, etc., to the monitor circuitry, thereby further saving power. In one or more implementations, tamper-detect circuit 800 may be disposed adjacent to continuous groove 312 in multilayer circuit board 310, as depicted in FIG. 8.

Figure 10:
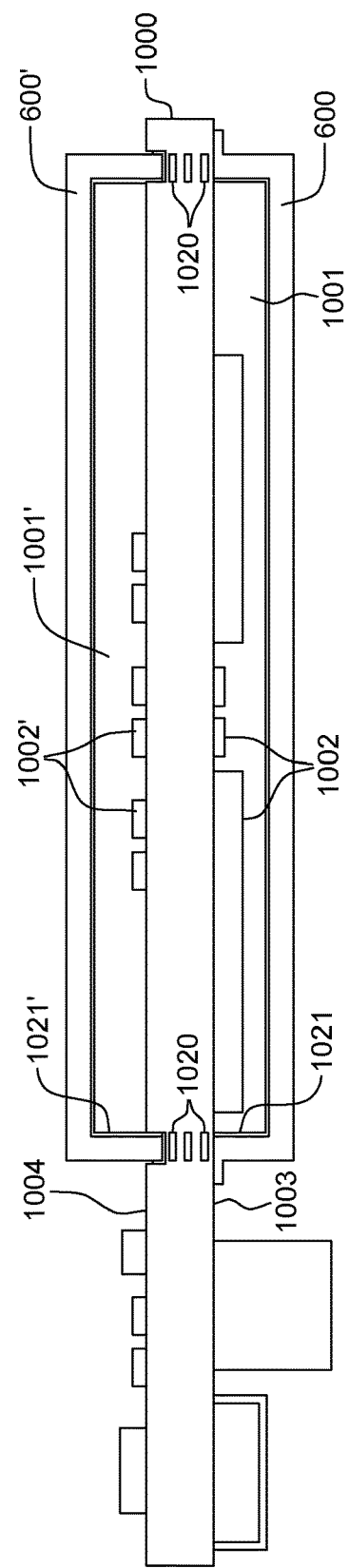
FIG. 10 is a cross-sectional elevational view of a further embodiment of a tamper proof electronic package, or tamper-respondent assembly, which includes (in part) a first enclosure mounted to one side of a circuit board, and a second enclosure mounted to a second side of the circuit board each with tamper-respondent sensors, in accordance with one or more aspects of the present invention.

FIG. 10 depicts a further embodiment of a tamper-proof electronic package, or tamper-respondent assembly, which includes one or more electronic components 1002, 1002' to be protected, in accordance with one or more further aspects of the present invention. As illustrated, electronic components 1002, 1002' reside on a first side 1003 and a second side 1004, respectively, of circuit board 1000, which are opposite sides of circuit board 1000. The electronic components 1002, 1002' are enclosed in respective secure volumes 1001, 1001' via respective enclosures 600, 600' each of which includes one or more tamper-respondent sensors 1021, 1021' on inner surfaces thereof, such as the above-described tamper-respondent sensors 710, 720 of FIGS. 7A & 7B. In this embodiment, circuit board 1000 may be a multilayer circuit board, such as multilayer circuit board 310 (FIGS. 3A-5) discussed above, or may be of different construction. In one example, circuit board 1000 may be a card, such as a communications card which resides within a larger electronic assembly. Further, note that in this example, enclosure 600' mounts to second side 1004 of circuit board 1000 within a continuous groove or trench, such as trench 312 discussed above with reference to FIGS. 3A & 3B, and enclosure 600 flush mounts to first side 1003 of circuit board 1000, and defines an enclosure-to-board interface where the edge of the enclosure 600 contacts circuit board 1000. Any appropriate structural adhesive may be used to secure the enclosures 600, 600' to the respective sides of circuit board 1000. By way of further example, circuit board 1000 may also be provided with one or more lines of conductive vias 1020 arranged around the perimeter of the secure volume 1001, 1001' as a protective picket-fence-type tamper-detect circuit(s) within the board, which may be for instance, aligned between the respective enclosures 600, 600' where contacting circuit board 1000.

Note that the further embodiment of FIG. 10 is provided by way of example only. In one or more other implementations, a single enclosure may flush mount to a single side of circuit board 1000, or each enclosure 600, 600' may flush mount to a respective side of circuit board 1000, or even to a common side, with each flush mount defining a respective enclosure-to-board interface. Note also that a flush mount configuration is different from the tamper-respondent assembly of FIGS. 3A & 3B in that with a flush mount, the enclosure mounts directly to a surface of a circuit board, without the use of one or more trenches. Further, note that in the embodiments disclosed herein the enclosures may each be a solid structure without any openings (in one or more implementations). For instance, the enclosures may be pedestal-type or five-sided enclosures which substantially completely seal and form the secure volumes, such as secure volumes 1001, 1001' when the respective enclosures are mounted to the different sides of circuit board 1000. By way of additional enhancement, FIGS. 11A-15B depict various embodiments of tamper-proof enclosure-to-board interfaces which may be used, for example, in connection with a tamper-respondent assembly such as depicted in FIG. 10, or variations thereof.

Figure 11A:
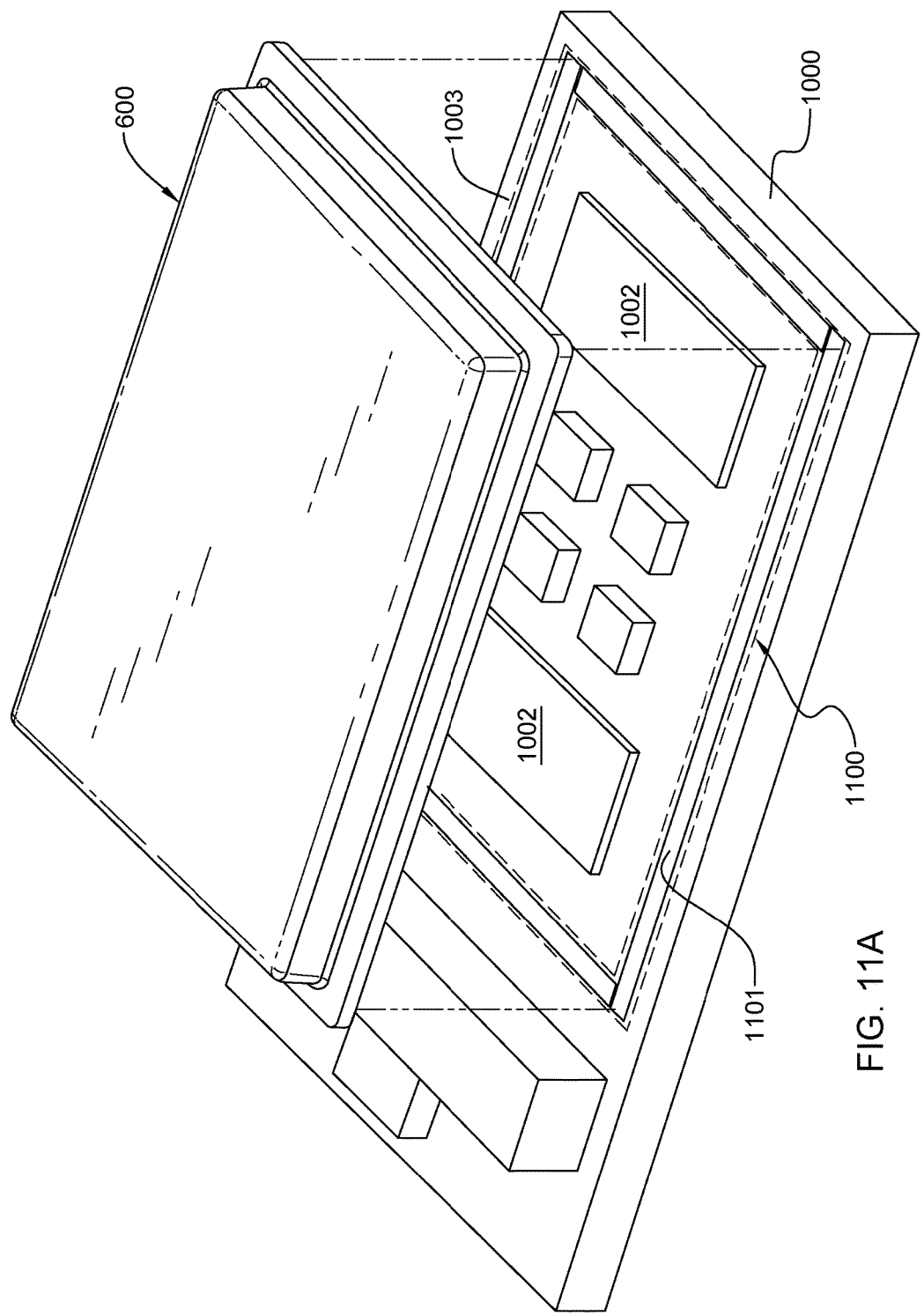
FIG. 11A is a partially exploded, isometric view of one embodiment of a tamper-respondent assembly to be provided with enclosure-to-board interface protection, in accordance with one or more aspects of the present invention.

FIG. 11A depicts one embodiment of a tamper-respondent assembly to be provided with enclosure-to-board interface protection, in accordance with one or more aspects of the present invention. This tamper-respondent assembly again includes, for instance, circuit board 1000, which is sized and configured to receive on one side 1003 an edge of an enclosure 600 with mounting of enclosure 600 to circuit board 1000 within enclosure-to-board interface 1100. In this example, an adhesive 1101 may reside on circuit board 1000 within enclosure-to-board interface 1100 where enclosure 600 mounts to circuit board 1000. In one or more embodiments, adhesive 1101 is a structural adhesive that facilitates securing enclosure 600 to circuit board 1000.

The secure volume within which electronic components 1002 reside is defined, in part, within the region encircled by enclosure-to-board interface 1100. This may be achieved, at least in part, by using a tamper-respondent electronic circuit structure such as disclosed herein. For instance, inner sidewall tamper-respondent sensor 710 (FIGS. 7A & 7B), inner main surface tamper-respondent sensor 720 (FIGS. 7A & 7B), and optionally, one or more embedded tamper-respondent sensors (or tamper-detect circuits) within circuit board 1000 may be used (such as described above in connection with multilayer circuit board 310). By way of example only, one or more electronic components 1002 within the secure volume may include monitor circuitry of the tamper-respondent electronic circuit structure, as well as, for instance, one or more encryption modules and/or decryption modules, and associated components.

By way of enhancement, increased protection against and/or sensitivity to a tamper event is disclosed herein for, for instance, a tamper-respondent assembly which includes one or more enclosures that mount directly to an upper and/or lower surface or side of a circuit board. As explained further below, the assembly may include a circuit board, an enclosure mounted to the circuit board along an enclosure-to-board interface, a tamper-respondent electronic circuit structure facilitating defining a secure volume, and an adhesive securing the enclosure to the circuit board. The enclosure facilitates enclosing at least one electronic component coupled to the circuit board within a secure volume, and the tamper-respondent electronic circuit structure includes one or more tamper-detect circuits, including at least one conductive trace disposed, at least in part, within the enclosure-to-board interface. The at least one conductive trace, such as a serpentine trace, includes stress rise regions that facilitate detecting a tamper event at the enclosure-to-board interface. The adhesive contacts, at least in part, the at least one conductive trace of the one or more tamper-detect circuits within the enclosure-to-board interface, including at the stress rise regions of the at least one conductive trace.

As explained herein, in one or more implementations, the at least one conductive trace may include unexposed regions and exposed regions within the enclosure-to-board interface, and with the at least one conductive trace being exposed to the adhesive in the exposed regions and unexposed to the adhesive to the unexposed regions to facilitate defining the stress rise regions. For instance, a solder mask may be employed to partially cover the at least one conductive trace, and define the unexposed regions of the at least one conductive trace within the enclosure-to-board interface. In one or more embodiments, the at least one conductive trace may be or include a serpentine conductive trace with angle bends within the enclosure-to-board interface. The angle bends may be, for instance, right angle bends and/or acute angle bends to further define the stress rise regions.

In one or more embodiments, the serpentine conductive trace, either with or without the solder mask, may include multiple conductive vias that intersect the serpentine conductive trace and extend into the circuit board. The multiple conductive vias may facilitate defining, at least in part, the stress rise regions of the at least one conductive trace. In one implementation, the multiple conductive vias may extend through the circuit board and contact the serpentine conductive trace at respective angle bends.

In one or more embodiments, the serpentine conductive trace may reside on a surface of the circuit board, and be disposed in part within an area of the enclosure-to-board interface and in part within the secure volume, for instance, at an inner periphery of the enclosure-to-board interface. In one or more implementations, the angle bends of the serpentine conductive trace, when present, may include a first set of angle bends within the enclosure-to-board interface, and a second side of angle bends disposed within the secure volume, for instance, at the inner periphery of the enclosure-to-board interface. By way of example, the conductive trace may be a conductive circuit that resides, in part, on one side of the circuit board, and includes the multiple conductive vias that extend into the circuit board. In one or more embodiments, the conductive circuit may also reside on another side of the circuit board, where the one side and the other side are opposite sides of the circuit board, and be stitched together by the multiple conductive vias.

The above and other embodiments, are described below in greater detail with reference to FIGS. 11B-15B. As specific examples, one or more embodiments disclosed herein utilize serpentine conductive traces (such as traces formed of a metal or metal alloy material, or a resistive material such as NiP, NiCr or Carbon ink, etc.) on a surface of the circuit board, such as an epoxy base card, under the footprint of the enclosure or enclosures to be affixed to the circuit board with an adhesive. Note that in one or more implementations, the adhesive might contain, for instance, approximately 50-micron glass beads for bond-line thickness control, or as discussed herein, a patterned solder mask may be disposed over the conductive trace(s) within the enclosure-to-board interface, which may also serve as a standoff for the enclosure (and provide a level of protection to the exposed conductive trace prior to adhesive and enclosure attach). When used in an implementation such as depicted in FIG. 10, conductive traces may be employed on the first side and/or second side of the circuit board within the respective enclosure-to-board interfaces. Note that these traces may be different traces connected to the monitor circuitry disposed, for instance, within the secure volume(s), or in one or more aspects, a common trace, or part of a common conductive circuit, such as described further herein. Advantageously, using approaches such as disclosed herein, the surface-mount components of the tamper-detect circuit of FIGS. 8 & 9 may be eliminated, thereby consuming less real estate on the circuit board in the area of the enclosure. Further, improved reliability in tamper detection may be achieved using the tamper-respondent electronic circuit structures such as disclosed herein.

In one or more embodiments, an additional level of tamper protection is provided using one or more conductive traces and related structures on one or both surfaces of the circuit board depending on whether there are one or two enclosures, or more, to mount to the circuit board. Note in this regard that various aspects disclosed herein may be used in combination with any enclosure-to-board interface from one to many enclosures mounted to the circuit board. In one or more embodiments, the enclosure is adhesively bonded to the surface of the board directly over, at least in part, these conductive traces. When a tamper event occurs, for instance, by an attempted separation of an enclosure from the circuit board, one or more of the conductive traces, through pre-design, break leading to tamper detection. Enhanced tamper detection capability is provided by configuring the conductive trace(s) with discrete stress concentration points, referred to herein as stress rise regions. These stress rise regions (or stress risers) may be achieved by a variety of techniques, which may be used alone, or in combination, as discussed further below.

Figure 11B:
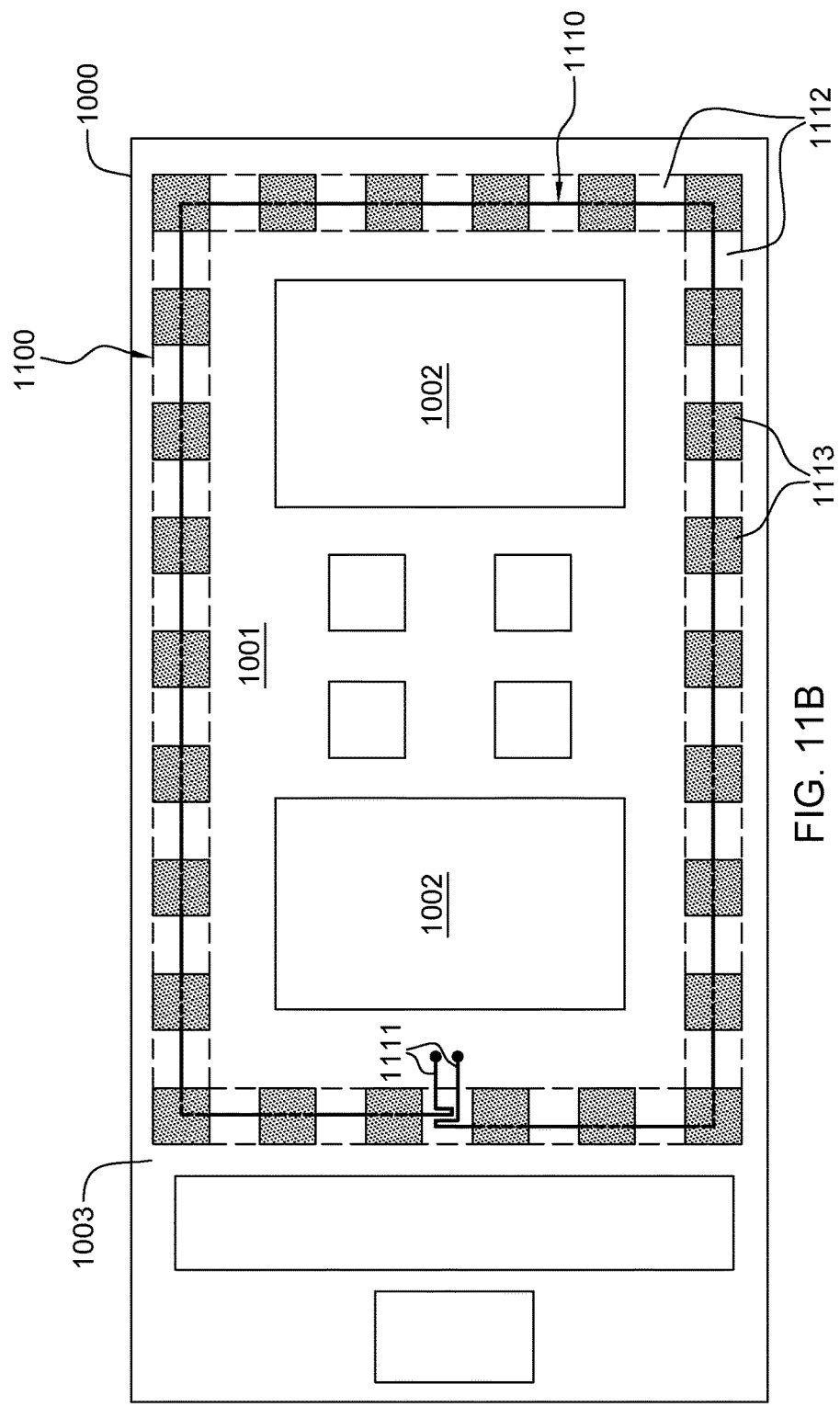
FIG. 11B depicts a plan view of the assembly of FIG. 11A with a tamper-detect circuit shown that includes a conductive trace with stress rise regions, in accordance with one or more aspects of the present invention.

FIG. 11B is a plan view of one embodiment of a tamper-respondent assembly such as disclosed herein which includes a circuit board 1000 to which an enclosure (not shown) is mounted within an enclosure-to-board interface 1100. As explained in detail above, the enclosure may include one or more tamper-respondent sensors on an inner surface thereof, such as sensors 710, 720 of FIGS. 7A & 7B. Additionally, circuit board 1000 may include an embedded tamper-detect circuit (such as described above) in order to facilitate defining secure volume 1001 within which one or more electronic components 1002 reside. As noted above, in an alternate configuration, a second enclosure such as depicted in FIG. 10 may be mounted to an opposite side of circuit board 1000, which along with picket-fence-type tamper-detect circuits within the board cooperate to define the secure volume associated with the circuit board, including secure volume 1001.

In the embodiment of FIG. 11B, a tamper-respondent electronic circuit structure is provided which includes one or more tamper-detect circuits 1110 that include at least one conductive trace disposed, at least in part, within enclosure-to-board interface 1100. The tamper-detect circuit 1110 includes terminal leads 1111 which connect to monitor circuitry (not shown) disposed within secure volume 1001 to monitor for, for instance, a change in resistance in the conductive trace(s) of tamper-detect circuit 1110 indicative of a tamper event. In the example of FIG. 11B, tamper-detect circuit 1110, and more particularly, the conductive trace, is a single conductive trace which extends around the perimeter of secure volume 1001 within the enclosure-to-board interface 1100. Further, as shown, the conductive trace(s) includes exposed regions 1112 and unexposed regions 1113, which in the embodiment depicted, are provided in an alternating pattern (by way of example only). The conductive trace(s) being exposed means that the trace is exposed to the adhesive to be applied in the enclosure-to-board interface 1100 when mounting the enclosure to circuit board 1000. Similarly, unexposed regions 1113 mean that the trace(s) is not directly exposed to the adhesive, but rather, is coupled to the adhesive across a mask, such as a solder mask. In one or more embodiments, the solder mask may be formed over the tamper-detect circuit 1110, and in particular, over the conductive trace(s) before the adhesive is applied within enclosure-to-board interface 1100. By providing both exposed and unexposed regions of conductive trace, the adhesive differently attaches to the conductive trace(s) in the different regions, and facilitates defining stress rise regions that facilitate detecting a tamper event at the enclosure-to-board interface. For instance, the adhesive may adhere better to the conductive trace in the unexposed regions which may result in stress rise regions being formed within the conductive trace where the conductive trace transitions from the exposed region to the unexposed regions on either side of the exposed region. In another embodiment, the adhesive could adhere more strongly to the solder mask such that the conductive trace(s) may be more likely to separate in the unexposed regions, with the stress rise regions being defined again at the interface between the exposed regions 1112 and unexposed regions 1113.

Figure 12A:
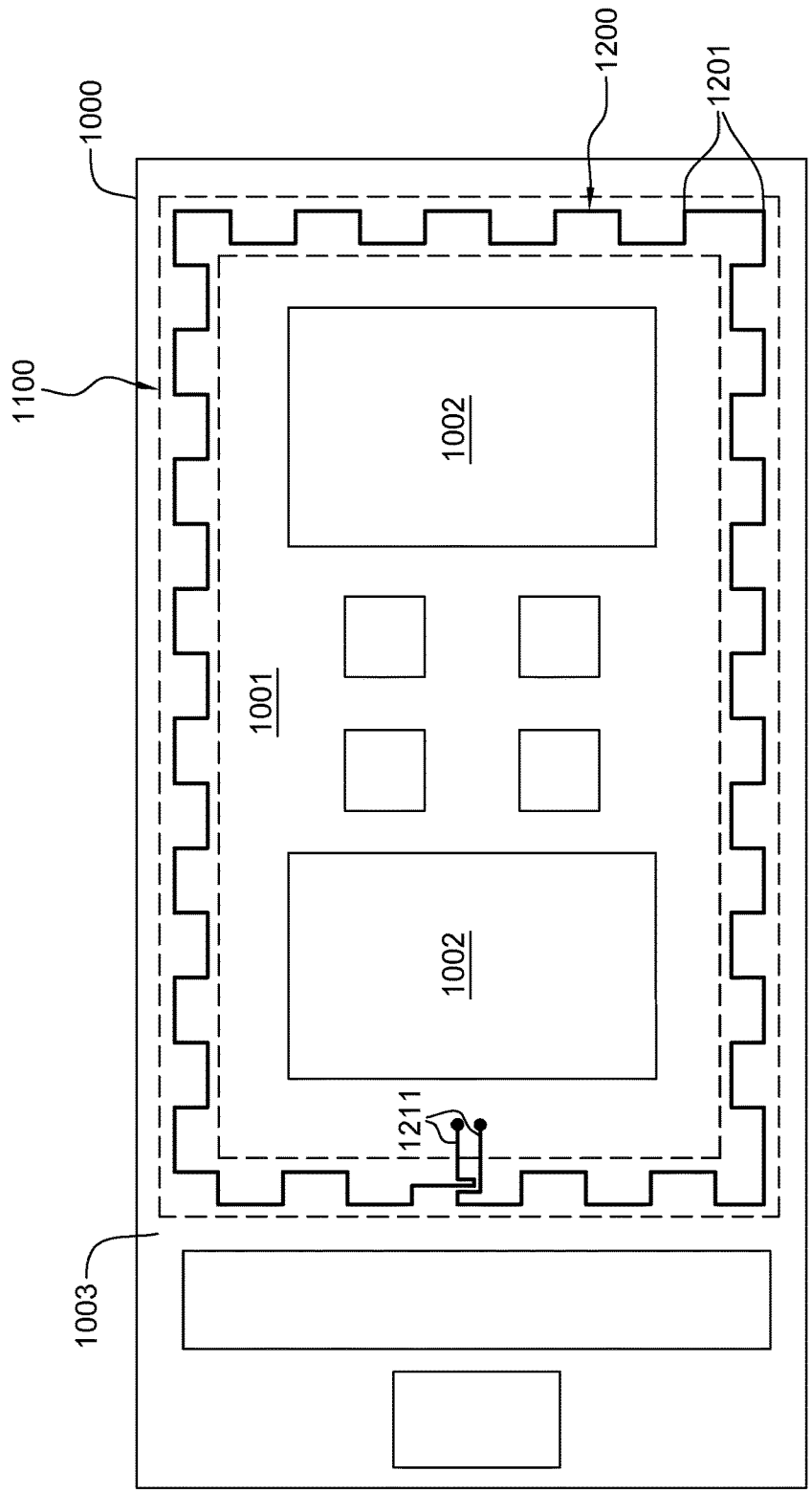
FIG. 12A depicts a plan view of an alternate embodiment of a tamper-proof enclosure-to-board interface of a tamper-respondent assembly, in accordance with one or more aspects of the present invention.

FIG. 12A depicts another embodiment of a tamper-respondent assembly such as disclosed herein, wherein the tamper-detect circuit 1200 within enclosure-to-board 1100 is shown differently configured from tamper-detect circuit 1110 of FIG. 11B. In FIG. 12A, tamper-detect circuit 1200 includes a serpentine conductive trace which has angle bends shown in the example to be right angle bends disposed within enclosure-to-board interface 1100. As described above, the conductive trace with right angle bends may be formed on one side 1003 (or both) of circuit board 1000 within enclosure-to-board interface 1100 to facilitate defining secure volume 1001 having one or more electronic components 1002 to be protected. The tamper-detect circuit 1200 includes terminal leads 1211 which connect to monitor circuitry (not shown) within secure volume 1001 for monitoring, for instance, for a tamper event by detection of a change in resistance in tamper-detect circuit 1200. In implementation, angle bends 1201, in this case, right angle bends, are further examples of stress rise regions. Should a tamper event occur, the stress resulting from an attempted forcing of the enclosure away from the circuit board will propagate to the closest angle bend at which the stress is most likely to cause a break, and therefore, detection of the tamper event. Note that the solder mask embodiment of FIG. 11B may be used in combination with tamper-detect circuit 1200 of FIG. 12A, if desired to define exposed and unexposed regions of the conductive trace.

Figure 12B:
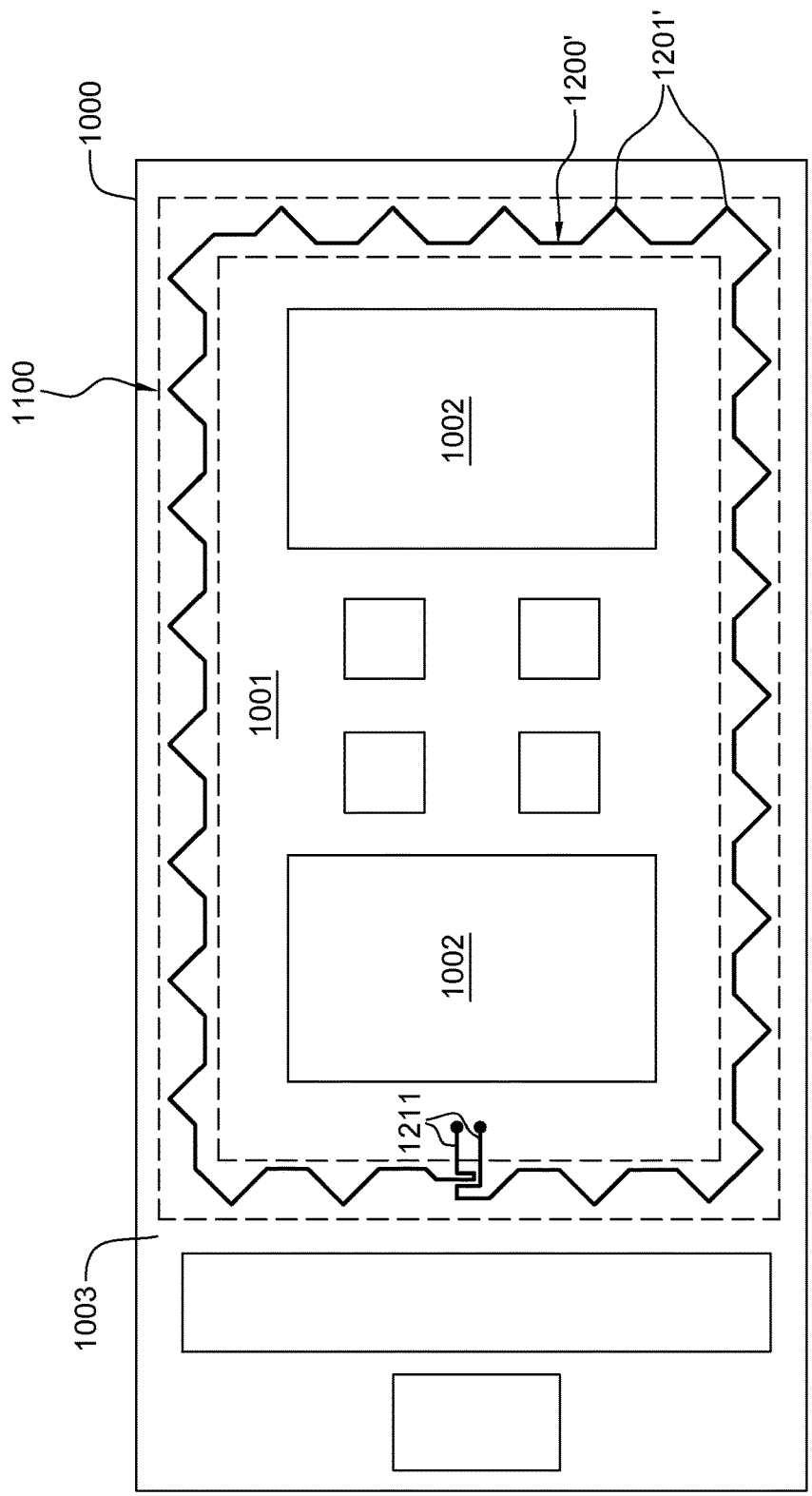
FIG. 12B depicts a further embodiment of a tamper-proof enclosure-to-board interface of a tamper-respondent assembly, in accordance with one or more aspects of the present invention.

FIG. 12B depicts a variation on the embodiment of FIG. 12A wherein the conductive trace of tamper-detect circuit 1200' again includes angle bends, such as right angle bends 1201' within enclosure-to-board interface 1100 on side 1003 of circuit board 1000 (by way of example only). Tamper-detect circuit 1200' again includes terminal leads 1211, and facilitates providing enhanced tamper detection for secure volume 1001, and in particular, for the electronic components 1002 within secure volume 1001.

Figure 13A:
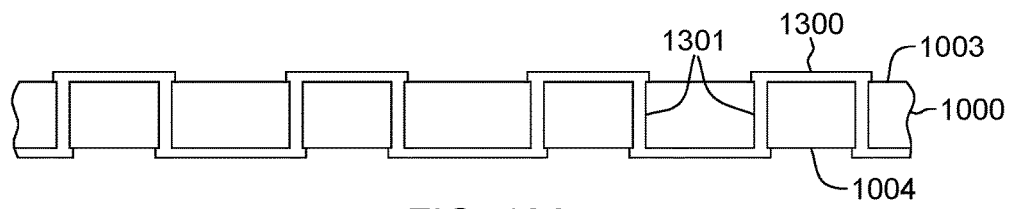
FIG. 13A is a cross-sectional elevational view of another embodiment of a tamper-proof enclosure-to-board interface of a tamper-respondent assembly, in accordance with one or more aspects of the present invention.
Figure 13B:
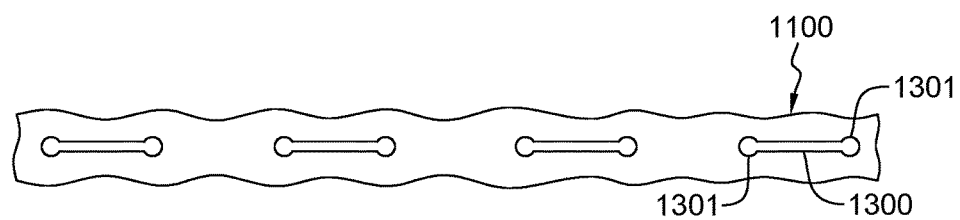
FIG. 13B is a partial plan view of the enclosure-to-board interface of FIG. 13A, in accordance with one or more aspects of the present invention.

As a further example, FIGS. 13A & 13B depict side elevational and plan views respectively, of a portion of a tamper-detect circuit 1300 on one side 1003 of circuit board 1000 within enclosure-to-board interface 1100, such as described above. In this configuration, tamper-detect circuit 1300 includes a conductive trace, along with multiple conductive vias 1301 which anchor the conductive trace to circuit board 1000, and thereby facilitate defining the stress rise regions at the points of anchoring, that is, at the conductive vias 1301. A vertically serpentine conductive trace is provided as shown in FIG. 13A, extending through circuit board 1000. In this configuration, the serpentine conductive trace or circuit extends between one side 1003 and the other side 1004 of circuit board 1000, and then back out. In one or more implementations, not shown, the serpentine conductive circuit could extend only into circuit board 1000, for instance, to one or more metal layers of circuit board 1000, and then back out. As with the embodiments discussed above, various configurations may be used in combination. For instance, the solder mask of FIG. 11B could be used on one or both surfaces of a tamper-respondent assembly with a tamper-detect circuit 1300 such as depicted in FIGS. 13A & 13B, and one or more of the conductive traces may be configured with angle bends, such as right angle bends, disposed, for instance, on one or more both sides of the circuit board.

Figure 14A:
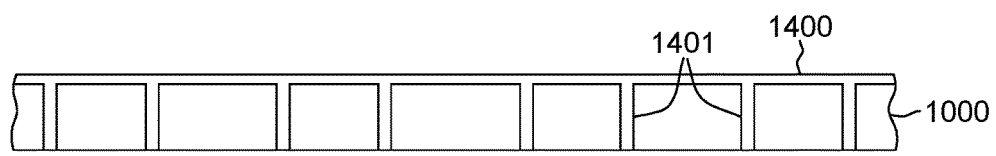
FIG. 14A is a cross-sectional elevational view of still another embodiment of a tamper-proof enclosure-to-board interface of a tamper-respondent assembly, in accordance with one or more aspects of the present invention.
Figure 14B:
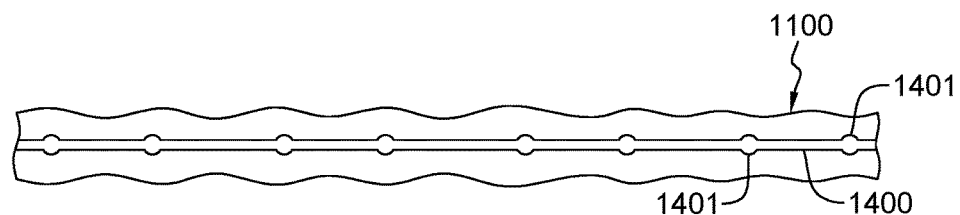
FIG. 14B is a partial top plan view of the enclosure-to-board interface with tamper protection of FIG. 14A, in accordance with one or more aspects of the present invention.

FIGS. 14A & 14B depict a variation on the embodiment of FIGS. 13A & 13B wherein a tamper-detect circuit 1400 is provided on one side of circuit board 1000 with conductive vias 1401 intersecting the tamper-detect circuit 1400 and extending into and (in the embodiment depicted), through circuit board 1000. Note that the conductive vias serve as anchor points which define stress rise regions for the conductive trace of the tamper-detect circuit 1400. The conductive vias may be provided in any desired pattern to intersect the conductive trace. Also, note that although shown as extending through circuit board 1000, the stress rise regions could be defined by multiple conductive vias extending partially into, but not through the circuit board.

Figure 15A:
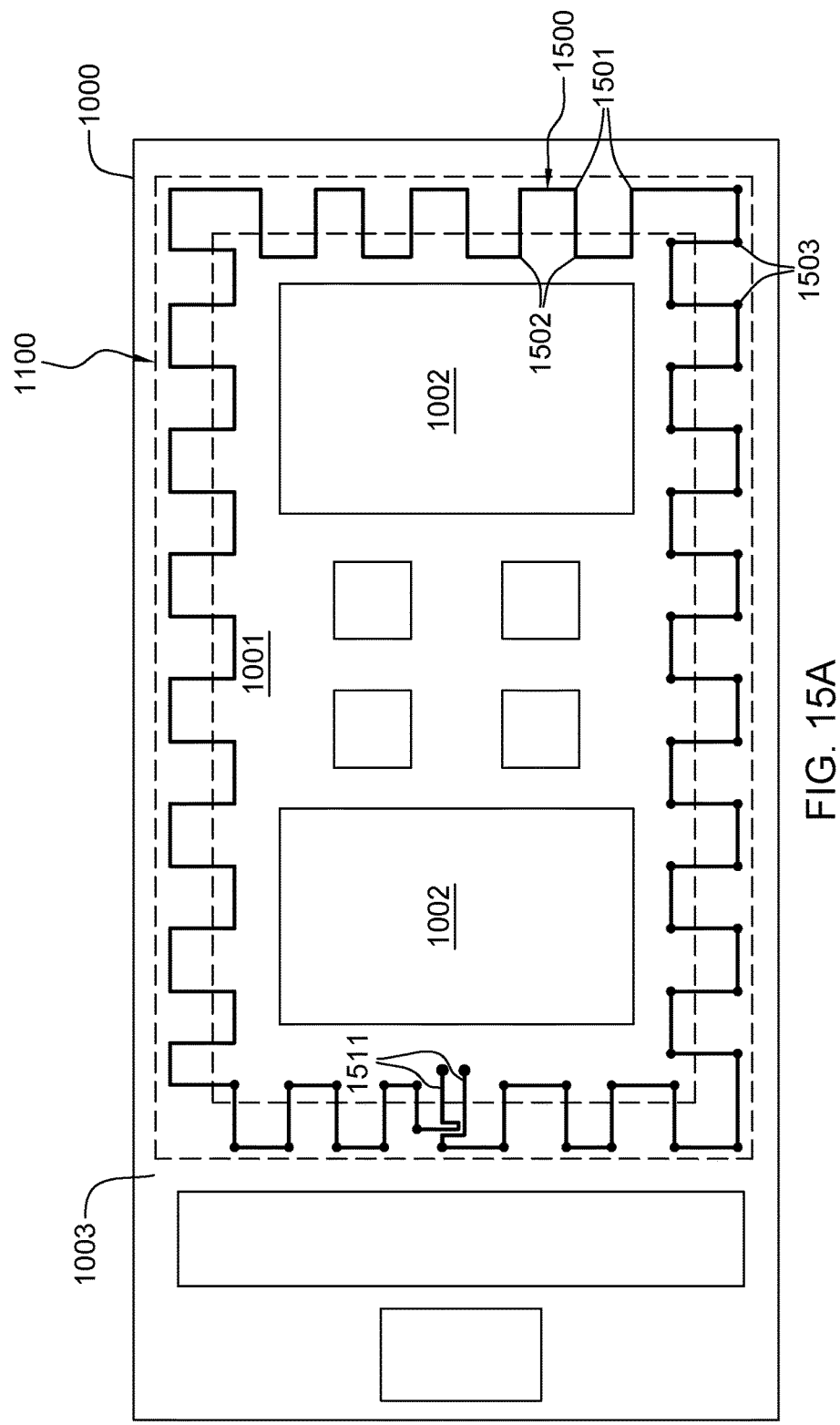
FIG. 15A is a plan view of another embodiment of a tamper-proof enclosure-to-board interface of a tamper-respondent assembly, in accordance with one or more aspects of the present invention.

FIG. 15A depicts a further embodiment, wherein a tamper-detect circuit 1500 is shown on one side 1003 of circuit board 1000 within enclosure-to-board interface 1100, as well as extending within secure volume 1001 at the inner periphery of enclosure-to-board interface 1100. In this configuration, tamper-detect circuit 1500 includes a serpentine conductive circuit or trace which includes, for instance, a first set of angle bends 1501, such as right angle bends, and a second set of angle bends 1502, such as right angle bends. As shown, first sent of angle bends 1501 are located within enclosure-to-board interface 1100, and second set of angle bends 1502 are located within secure volume 1001. Depending on the implementation, the adhesive to be provided may remain within enclosure-to-board interface 1100, or may be as well at the inner periphery of enclosure-to-board interface 1100, within secure volume 1001, that is, when the enclosure is mounted to the circuit board.

By way of further example, conductive vias 1503 are shown on multiple sides of the enclosure-to-board interface 1100. These conductive vias 1503 serve as anchor points and may extend into and/or through circuit board 1000 as noted above, and may be provided in any pattern desired to intersect the tamper-detect circuit 1500. In the example shown, the conductive vias are located at the angle bends 1501, 1502. Alternatively, the conductive vias could intersect straight line portions of the tamper-detect circuit 1500, and/or could be located only within the enclosure-to-board interface 1100, or only outside of the enclosure-to-board interface within the secure volume 1001. As shown, tamper-detect circuit 1500 further includes terminal leads 1511 which connect to monitor circuitry (not shown) within secure volume 1001, such as within one or more electronic components 1002. Also, note that the stress rise regions could be further defined or enhanced by providing a mask such as a solder mask, over the tamper-detect circuit in any desired pattern, such as described above.

Figure 15B:
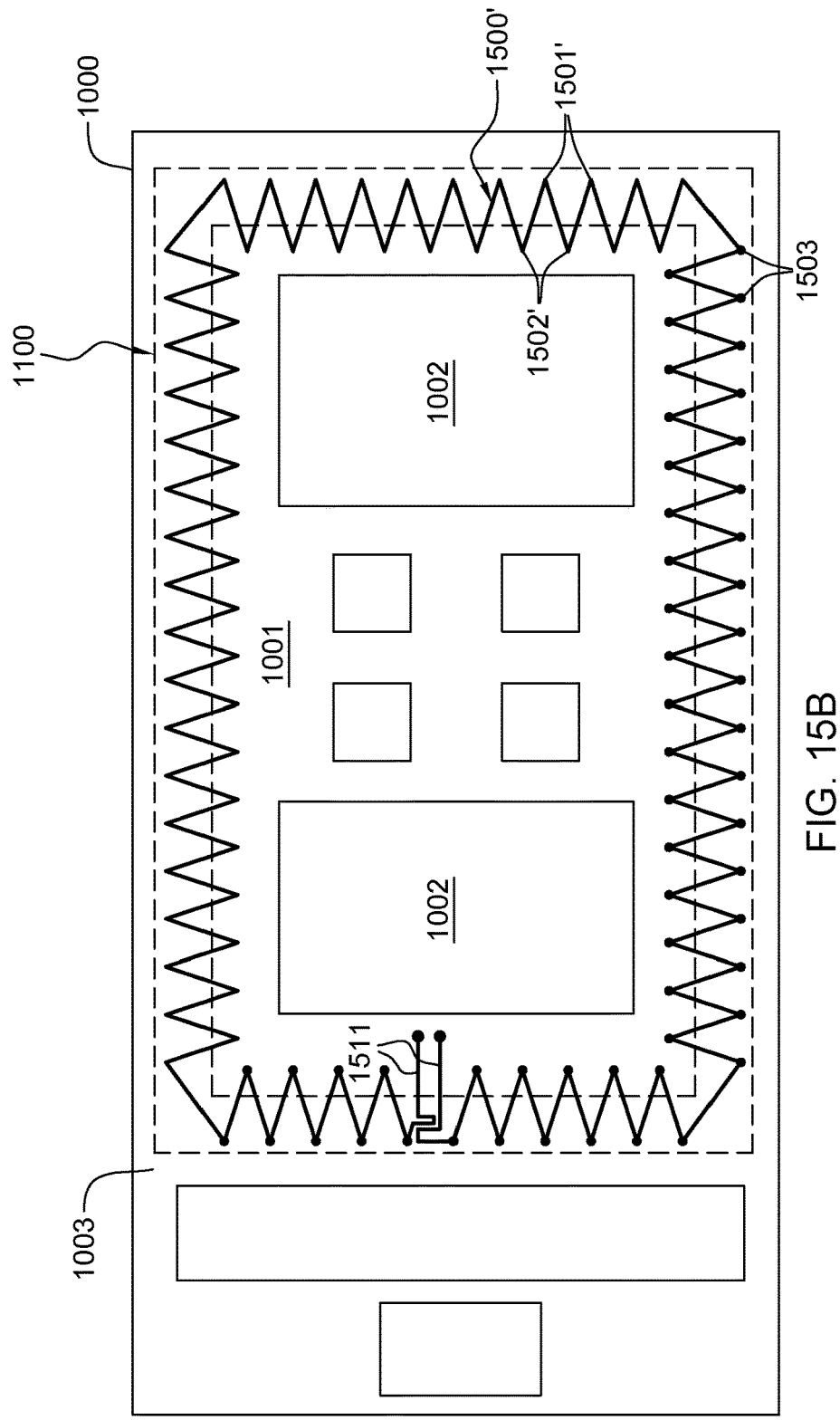
FIG. 15B is a yet further embodiment of a tamper-proof enclosure-to-board interface of a tamper-respondent assembly, in accordance with one or more aspects of the present invention.

In FIG. 15B, a tamper-detect circuit 1500' is shown similar to tamper-detect circuit 1500 of FIG. 15A, but the serpentine conductive circuit is shown with acute angle bends 1501', 1502', rather than right angle bends. Again, the serpentine conductive trace extends between enclosure-to-board interface 1100 and an area of secure volume 1001 along the inner periphery of enclosure-to-board interface 1100. As with the embodiment of FIG. 15A, one or more conductive vias 1503 may be provided as anchor points at desired locations (such as at the angle bends) to further enhance or define the stress rise regions associated with the conductive trace of the tamper-detect circuit 1500.

As noted herein, numerous inventive aspects and features are disclosed, and unless otherwise inconsistent, each disclosed aspect or feature may be combined with any other disclosed aspect or feature as desired to achieve a particular application, for instance, to achieve a particular tamper-detect circuit at an enclosure-to-board interface with the desired stress rise region characteristics to, for instance, enhance tamper proof enclosure-to-board interface protection.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A tamper-respondent assembly comprising:
a circuit board;
an enclosure mounted to the circuit board along an enclosure-to-board interface, the enclosure facilitating enclosing at least one electronic component coupled to the circuit board within a secure volume;
a tamper-respondent electronic circuit structure facilitating defining the secure volume, the tamper-respondent electronic circuit structure comprising one or more tamper-detect circuits defined, at least in part, by at least one conductive trace disposed, at least in part, within the enclosure-to-board interface, the at least one conductive trace comprising stress rise regions to facilitate detecting a tamper event at the enclosure-to-board interface;
an adhesive securing the enclosure to the circuit board, the adhesive contacting, at least in part, the at least one conductive trace of the one or more tamper-detect circuits within the enclosure-to-board interface, including at the stress rise regions of the at least one conductive trace;
a solder mask, the solder mask partially covering the at least one conductive trace, and defining unexposed regions of the at least one conductive trace within the enclosure-to-board interface; and
wherein the at least one conductive trace comprises the unexposed regions and exposed regions within the enclosure-to-board interface, the at least one conductive trace being exposed to the adhesive in the exposed regions and unexposed to the adhesive in the unexposed regions to facilitate defining the stress rise regions.

2. The tamper-respondent assembly of claim 1, wherein the at least one conductive trace comprises a serpentine conductive trace with angle bends disposed, at least in part, within the enclosure-to-board interface, and the angle bends are selected from the group comprising right angle bends and acute angle bends.

3. The tamper-respondent assembly of claim 2, further comprising multiple conductive vias intersecting the serpentine conductive trace and extending into the circuit board, the multiple conductive vias facilitating defining, at least in part, the stress rise regions of the at least one conductive trace.

4. The tamper-respondent assembly of claim 3, wherein the multiple conductive vias extend through the circuit board.

5. The tamper-respondent assembly of claim 2, wherein the serpentine conductive trace resides on a surface of the circuit board, and is disposed in part within an area of the enclosure-to-board interface and in part within the secure volume, at an inner periphery of the enclosure-to-board interface.

6. The tamper-respondent assembly of claim 5, further comprising multiple conductive vias intersecting the serpentine conductive trace and extending into the circuit board, the multiple conductive vias facilitating defining, at least in part, the stress rise regions of the at least one conductive trace.

7. The tamper-respondent assembly of claim 5, wherein the angle bends of the serpentine conductive trace are a first set of angle bends, and wherein the serpentine conductive trace further comprises a second set of angle bends disposed within the secure volume at the inner periphery of the enclosure-to-board interface.

8. The tamper-respondent assembly of claim 1, wherein the at least one conductive trace comprises a conductive circuit residing, at least in part, on one side of the circuit board.

9. The tamper-respondent assembly of claim 8, wherein the conductive circuit further comprises multiple conductive vias extending into the circuit board.

10. The tamper-respondent assembly of claim 9, wherein the multiple conductive vias extend through the circuit board, and the conductive circuit resides, at least in part, on another side of the circuit board, the one side and the another side being opposite sides of the circuit board.

11. A tamper-respondent assembly comprising:
a circuit board;
at least one electronic component to be protected, the at least one electronic component being associated with the circuit board;
an enclosure mounted to the circuit board along an enclosure-to-board interface, the enclosure facilitating enclosing the at least one electronic component within a secure volume;
a tamper-respondent electronic circuit structure facilitating defining the secure volume, the tamper-respondent electronic circuit structure comprising one or more tamper-detect circuits comprising at least one conductive trace disposed, at least in part, within the enclosure-to-board interface, the at least one conductive trace comprising stress rise regions to facilitate detecting a tamper event at the enclosure-to-board interface;

an adhesive securing the enclosure to the circuit board, the adhesive contacting, at least in part, the at least one conductive trace of the one or more tamper-detect circuits within the enclosure-to-board interface, including at the stress rise regions of the at least one conductive trace;

a solder mask, the solder mask partially covering the at least one conductive trace, and defining unexposed regions of the at least one conductive trace within the enclosure-to-board interface; and wherein the at least one conductive trace comprises the unexposed regions and exposed regions within the enclosure-to-board interface, the at least one conductive trace being exposed to the adhesive in the exposed regions and unexposed to the adhesive in the unexposed regions to facilitate defining the stress rise regions.

12. The tamper-respondent assembly of claim 11, wherein the at least one conductive trace comprises a serpentine conductive trace with angle bends disposed, at least in part, within the enclosure-to-board interface, and the angle bends are selected from the group comprising right angle bends and acute angle bends.

13. The tamper-respondent assembly of claim 12, further comprising multiple conductive vias intersecting the serpentine conductive trace and extending into the circuit board, the multiple conductive vias facilitating defining, at least in part, the stress rise regions of the at least one conductive trace.

* * * * *